US012567440B2

(12) United States Patent
Kasada

(10) Patent No.: US 12,567,440 B2
(45) Date of Patent: *Mar. 3, 2026

(54) MAGNETIC TAPE APPARATUS HAVING CHARACTERIZED HEAD TILT ANGLE

(71) Applicant: FUJIFILM Corporation, Tokyo (JP)

(72) Inventor: Norihito Kasada, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,272

(22) Filed: May 30, 2024

(65) Prior Publication Data

US 2024/0321301 A1 Sep. 26, 2024

Related U.S. Application Data

(63) Continuation of application No. PCT/JP2022/043994, filed on Nov. 29, 2022.

(30) Foreign Application Priority Data

Dec. 2, 2021 (JP) ................................. 2021-195833

(51) Int. Cl.
  *G11B 5/588* (2006.01)
  *G11B 5/008* (2006.01)
(52) U.S. Cl.
  CPC .......... *G11B 5/588* (2013.01); *G11B 5/00817* (2013.01)
(58) Field of Classification Search
  None
  See application file for complete search history.

(56) References Cited

U.S. PATENT DOCUMENTS

| 5,510,168 A | * | 4/1996 | Mori | .................. G11B 5/73929 |
| 5,510,192 A | * | 4/1996 | Utsumi | .............. G11B 5/73931 |
| | | | | 428/323 |

(Continued)

FOREIGN PATENT DOCUMENTS

| JP | 2001-93138 A | 4/2001 |
| JP | 2002-367151 A | 12/2002 |

(Continued)

OTHER PUBLICATIONS

International Preliminary Report on Patentability dated May 5, 2024 with a Translation of the Written Opinion of the International Searching Authority in Application No. PCT/JP2022/043994.

(Continued)

*Primary Examiner* — William J Klimowicz
(74) *Attorney, Agent, or Firm* — Sughrue Mion, PLLC

(57) ABSTRACT

Provided is a magnetic tape apparatus. During running of a magnetic tape in the magnetic tape apparatus, an angle $\theta$ formed by an axis of an element array of a magnetic head with respect to a width direction of the magnetic tape is changed. The magnetic tape satisfies Expression 1, the Equation 1: TDSage+TDSenv−TC≤0.10 µm. In Expression 1, TDSage is a maximum value of an absolute value of a difference between a servo band interval obtained before storage and a servo band interval obtained after the storage in a predetermined environment for 36 hours. TDSenv is a value calculated by multiplying a difference between a maximum value and a minimum value in the servo band intervals obtained in each of predetermined five environments by ½, and TC is a value calculated by TC=L{cos $(\theta_{initial}-\Delta\theta)-\cos(\theta_{initial}+\Delta\theta)$}.

14 Claims, 6 Drawing Sheets

(56) References Cited

U.S. PATENT DOCUMENTS

| | | | |
|---|---|---|---|
| 6,222,698 | B1 | 4/2001 | Barndt et al. |
| 11,482,249 | B2 * | 10/2022 | Kasada ............... G11B 5/70678 |
| 11,735,213 | B2 * | 8/2023 | Kasada .................. G11B 5/739 |
| | | | 360/110 |
| 2003/0182605 | A1 | 9/2003 | Short et al. |
| 2003/0214745 | A1 | 11/2003 | Lau |
| 2004/0174628 | A1 | 9/2004 | Schwarz et al. |
| 2005/0168864 | A1 | 8/2005 | Knowles et al. |
| 2005/0168865 | A1 | 8/2005 | Simmons, Jr. et al. |
| 2007/0091499 | A1 | 4/2007 | Saliba |
| 2009/0246559 | A1 * | 10/2009 | Ishiguro .................. G11B 5/70 |
| | | | 83/52 |
| 2014/0002916 | A1 | 1/2014 | Harper |
| 2014/0327983 | A1 | 11/2014 | Biskeborn et al. |
| 2014/0327984 | A1 | 11/2014 | Biskeborn et al. |
| 2014/0327987 | A1 | 11/2014 | Biskeborn et al. |
| 2016/0019921 | A1 | 1/2016 | Bui et al. |
| 2019/0164573 | A1 | 5/2019 | Biskeborn |
| 2020/0357430 | A1 | 11/2020 | Biskeborn |
| 2021/0125633 | A1 | 4/2021 | Jurneke |
| 2021/0201945 | A1 * | 7/2021 | Kasada .................. G11B 5/735 |
| 2021/0241787 | A1 * | 8/2021 | Murata ............. G11B 5/00817 |
| 2021/0241795 | A1 * | 8/2021 | Murata .................. G11B 5/708 |
| 2023/0039477 | A1 | 2/2023 | Kasada |
| 2023/0045648 | A1 * | 2/2023 | Kasada .................. G11B 5/584 |

FOREIGN PATENT DOCUMENTS

| | | |
|---|---|---|
| JP | 2004-288332 A | 10/2004 |
| JP | 2016-524774 A | 8/2016 |
| JP | 2021-125273 A | 8/2021 |

OTHER PUBLICATIONS

International Search Report dated Feb. 14, 2023 in Application No. PCT/JP2022/043994.

Written Opinion of the International Searching Authority Dated Feb. 14, 2023 in International Application No. PCT/JP2022/043994.

Notice of Allowance issued Apr. 17, 2023 in U.S. Appl. No. 17/872,566.

* cited by examiner

FIG. 1

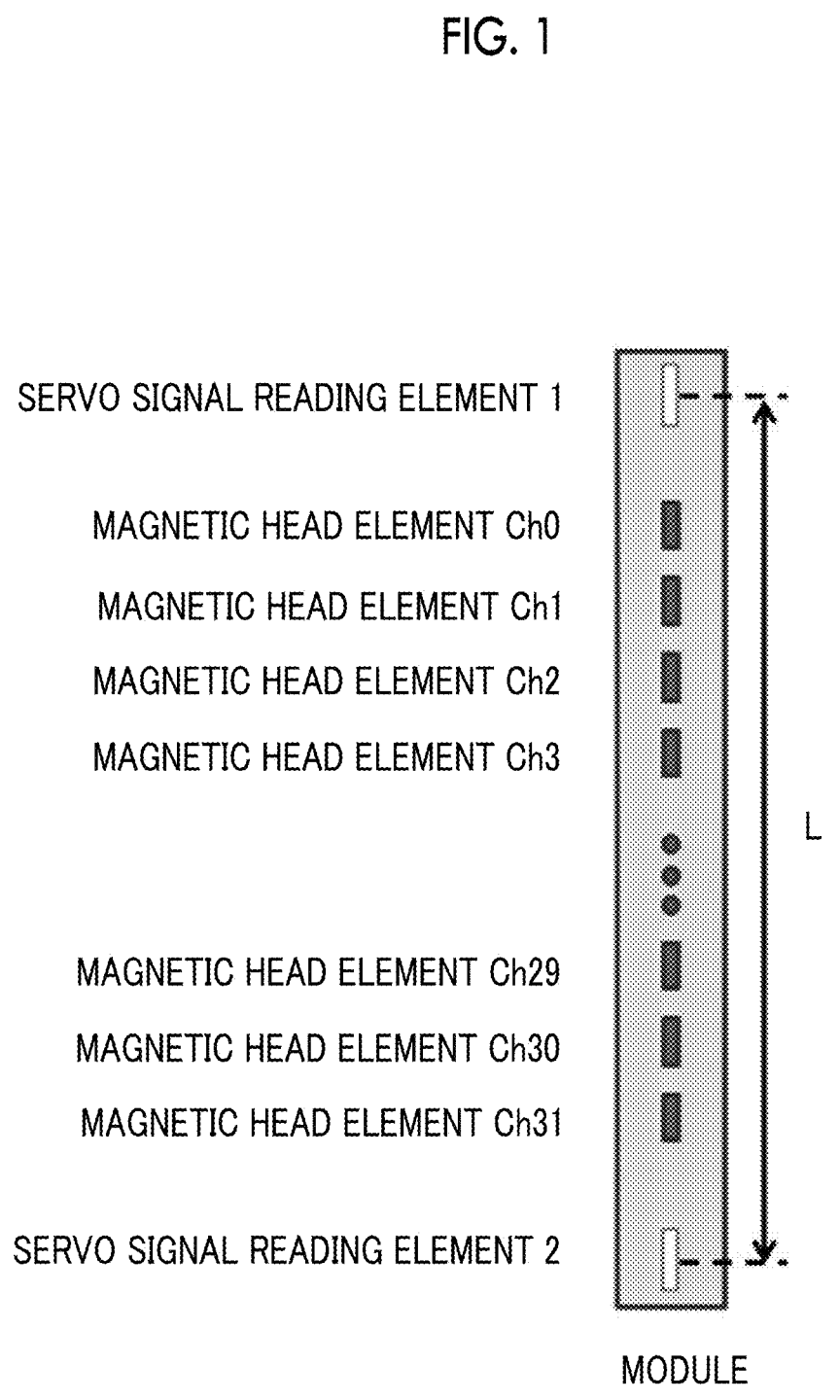

SERVO SIGNAL READING ELEMENT 1

MAGNETIC HEAD ELEMENT Ch0

MAGNETIC HEAD ELEMENT Ch1

MAGNETIC HEAD ELEMENT Ch2

MAGNETIC HEAD ELEMENT Ch3

L

MAGNETIC HEAD ELEMENT Ch29

MAGNETIC HEAD ELEMENT Ch30

MAGNETIC HEAD ELEMENT Ch31

SERVO SIGNAL READING ELEMENT 2

MODULE $L\cos\theta$ $\theta$

B

A

RUNNING DIRECTION
OF MAGNETIC TAPE

MT

MAGNETIC TAPE APPARATUS HAVING CHARACTERIZED HEAD TILT ANGLE

CROSS-REFERENCE TO RELATED APPLICATIONS

This application is a Continuation of PCT International Application No. PCT/JP2022/043994 filed on Nov. 29, 2022, which claims priority under 35 U.S.C. § 119(a) to Japanese Patent Application No. 2021-195833 filed on Dec. 2, 2021. Each of the above applications is hereby expressly incorporated by reference, in its entirety, into the present application.

BACKGROUND OF THE INVENTION

1. Field of the Invention

The present invention relates to a magnetic tape apparatus.

2. Description of the Related Art

There are two types of magnetic recording media: a tape shape and a disk shape, and a tape-shaped magnetic recording medium, that is, a magnetic tape is mainly used for data storage applications such as data backup and archiving (for example, see JP2016-524774A and US2019/0164573A1)

SUMMARY OF THE INVENTION

Recording of data on a magnetic tape is usually performed by running the magnetic tape in a magnetic tape apparatus and recording the data on a data band by making a magnetic head follow the data band of the magnetic tape. Thereby, a data track is formed in the data band. In addition, in a case where the recorded data is reproduced, the data recorded on the data band is read by running the magnetic tape in the magnetic tape apparatus and by making the magnetic head follow the data band of the magnetic tape.

In order to increase an accuracy of the magnetic head following the data band of the magnetic tape in recording and/or reproduction as described above, a system for performing head tracking using a servo signal (hereinafter, it is described as a "servo system") has been put into practical use.

Further, it has been proposed to acquire information on dimensions (contraction, expansion, or the like) in a width direction of the magnetic tape during running by using a servo signal and to change an angle (hereinafter, also referred to as a "head tilt angle") at which an axial direction of a module of a magnetic head is tilted against the width direction of the magnetic tape according to the acquired dimensional information (see JP2016-524774A and US2019/0164573A1, for example, paragraphs 0059 to 0067 and 0084 of JP2016-524774A). During recording or reproduction, in a case where the magnetic head for recording or reproducing data records or reproduces data while being deviated from a target track position due to the width deformation of the magnetic tape, a phenomenon such as overwriting of recorded data or reproduction failure may occur. The present inventors consider that changing the head tilt angle as described above is one of methods for suppressing the occurrence of such a phenomenon.

In view of the above, an object of an aspect of the present invention is to provide a magnetic tape apparatus capable of performing recording and/or reproducing in an excellent manner during recording and/or reproducing of data by changing a head tilt angle during running of a magnetic tape.

One aspect of the present invention is as follows.

[1] A magnetic tape apparatus comprising:

a magnetic tape; and a magnetic head, in which the magnetic head includes a module including an element array that includes a plurality of magnetic head elements between a pair of servo signal reading elements, the magnetic tape apparatus changes an angle $\theta$ formed by an axis of the element array with respect to a width direction of the magnetic tape, during running of the magnetic tape in the magnetic tape apparatus, and the magnetic tape includes a non-magnetic support and a magnetic layer containing ferromagnetic powder, the non-magnetic support is a polyethylene naphthalate support having a Young's modulus in a width direction of 10000 MPa or more, the magnetic layer includes a plurality of servo bands, the following Expression 1 is satisfied:

$$\text{TDSage} + \text{TDSenv} - TC \leq 0.10 \ \mu\text{m}, \qquad \text{(Expression 1)}$$

in Expression 1,

TDSage is a maximum value of an absolute value of a difference between a servo band interval obtained before storage and a servo band interval obtained after the storage, in an environment of a temperature of 60° C. and of a relative humidity of 20% for 36 hours, and a unit is $\mu$m, TDSenv is a value calculated by multiplying a difference between a maximum value and a minimum value in servo band intervals obtained respectively in the following five environments by $\frac{1}{2}$, and a unit is $\mu$m:

a temperature of 16° C. and a relative humidity of 20%, a temperature of 16° C. and a relative humidity of 80%, a temperature of 26° C. and a relative humidity of 80%, a temperature of 32° C. and a relative humidity of 20%, and a temperature of 32° C. and a relative humidity of 55%, the TC is a value calculated by $TC=L\{\cos(\theta_{initial}-\Delta\theta)-\cos(\theta_{initial}+\Delta\theta)\}$, and a unit is $\mu$m, the L is a distance between the pair of servo signal reading elements, and a unit is $\mu$m, the angle $\theta$ at start of the running of the magnetic tape is set as $\theta_{initial}$, a maximum value of the angle $\theta$ during the running of the magnetic tape is set as $\theta_{max}$ and a minimum value of the angle $\theta$ during the running of the magnetic tape is set as $\theta_{min}$, and the $\theta\Delta$ is a larger value among values calculated by $\theta\Delta_{max}=\theta_{max}-\theta_{initial}$, and $$\theta\Delta_{min}=\theta_{initial}-\theta_{min}.$$

[2] The magnetic tape apparatus according to [1], in which the $\theta_{initial}$ is equal to or more than 1.000° and equal to or less than 45.000°.

[3] The magnetic tape apparatus according to [1] or [2], in which the $\theta\Delta$ is more than 0.000° and equal to or less than 1.000°.

[4] The magnetic tape apparatus according to any one of [1] to [3], in which, during the running of the magnetic tape in the magnetic tape apparatus, the angle $\theta$ formed by the axis of the element array with respect to the width direction of the magnetic tape is changed in accordance with dimensional information in the width direction of the magnetic tape acquired during the running.

[5] The magnetic tape apparatus according to any one of [1] to [4], in which the Young's modulus of the poly-ethylene naphthalate support in the width direction is equal to or more than 10000 MPa and equal to or less than 20000 MPa.

[6] The magnetic tape apparatus according to any one of [1] to [5], in which a tape thickness of the magnetic tape is equal to or less than 5.6 μm.

[7] The magnetic tape apparatus according to any one of [1] to [6], in which a tape thickness of the magnetic tape is equal to or less than 5.2 μm.

[8] The magnetic tape apparatus according to any one of [1] to [7], in which the magnetic tape further includes a non-magnetic layer containing non-magnetic powder between the non-magnetic support and the magnetic layer.

[9] The magnetic tape apparatus according to any one of [1] to [8], in which the magnetic tape further includes a back coating layer containing non-magnetic powder on a surface side of the non-magnetic support opposite to a surface side including the magnetic layer.

[10] The magnetic tape apparatus according to any one of [1] to [9], in which a vertical squareness ratio of the magnetic tape is equal to or more than 0.60.

According to one aspect of the disclosure, it is possible to provide a magnetic tape apparatus capable of performing recording and/or reproducing in an excellent manner during recording and/or reproducing of data by changing a head tilt angle during running of a magnetic tape.

BRIEF DESCRIPTION OF THE DRAWINGS

FIG. 1 is a schematic diagram showing an example of a module of a magnetic head.

DESCRIPTION OF THE PREFERRED EMBODIMENTS

Figure 2:
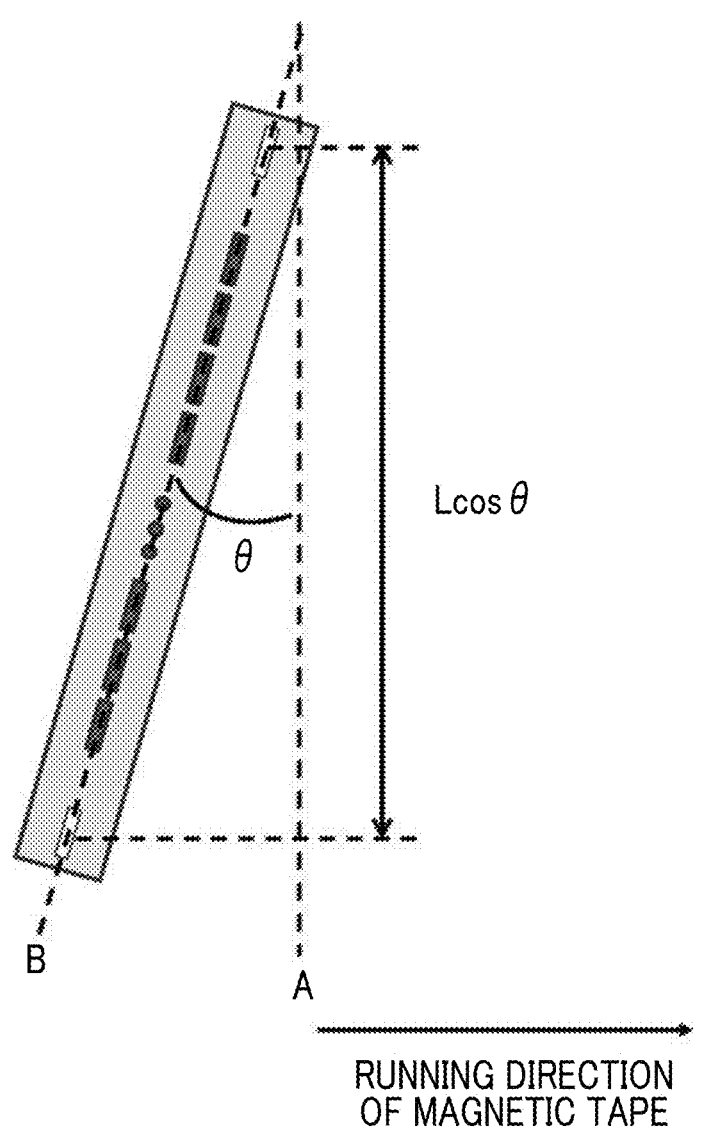
FIG. 2 is an explanatory diagram of a relative positional relationship between a module and a magnetic tape during magnetic tape running in a magnetic tape apparatus.

According to one aspect of the present invention, there is provided a magnetic tape apparatus including a magnetic tape and a magnetic head.

[Magnetic Tape]

The magnetic tape included in the magnetic tape appara-tus includes a non-magnetic support and a magnetic layer containing ferromagnetic powder, in which the non-mag-netic support is a polyethylene naphthalate support having a Young's modulus in a width direction, which is equal to or more than 10000 MPa, the magnetic layer includes a plu-rality of servo bands, and the magnetic tape satisfies the above-described Expression 1.

The present inventors have conducted studies in order to obtain a magnetic tape capable of favorably performing recording and/or reproducing of data by changing a head tilt angle during running of the magnetic tape, and have focused on that dimensional stability of the magnetic tape may change depending on a difference in measurement environ-ment. As a result of further intensive studies, the present inventors have reached a finding that a dimensional stability of a magnetic tape measured in various environments in which the magnetic tape may be placed during use and/or storage, is used as an indicator. This indicator is the-above described TDSage and TDSenv. It is intended that "TDS" is an abbreviation for "Tape Dimensional Stability", and "age" is an abbreviation for long-term storage. In addition, "env" is intended to be an abbreviation of "environment". "TDSage" in Expression 1 is a value obtained by a method described later, and the present inventors consider that the value may be an indicator of an amount of change in the servo band interval due to the long-term storage. In addition, "TDSenv" is a value obtained by a method described later, and the present inventors consider that the value may be an indicator of the amount of change in the servo band interval due to a use environment. In addition, the present inventors consider that "TC" obtained by a method described below may be an indicator of a track position deviation amount allowed in a case of performing recording and/or reproduc-ing of data by changing a head tilt angle during the running of the magnetic tape. As a result of intensive studies, the present inventors of the present invention have found that, in a case where the magnetic tape included in the magnetic tape apparatus is a magnetic tape in which "TDSage", "TDSenv", and "TC" satisfy Expression 1, the data can be suitably recorded and/or reproduced by changing the head tilt angle during the running of the magnetic tape. For example, it has been newly found that, in a case where the magnetic tape satisfying the above-mentioned Expression 1 is stored for a long period of time and then the head tilt angle is changed during the running of the magnetic tape to perform the recording and/or reproducing of data, the recording and/or reproducing can be suitably performed.

Hereinafter, the magnetic tape will be described in detail.
<Method for Measuring TDSage>

TDSage is acquired by the following method.

The magnetic tape cartridge accommodating the magnetic tape to be measured is placed in an environment of an atmosphere temperature of 23° C. and a relative humidity of 50% for 5 days in order to make the magnetic tape fit into the measurement environment.

After that, in a magnetic tape apparatus including a tension adjusting mechanism for applying a tension in a longitudinal direction of the magnetic tape in the measure-ment environment, the magnetic tape is allowed to run in a state where a tension of 0.7 N is applied in the longitudinal direction of the magnetic tape. For such running, an interval between two servo bands adjacent to each other with a data band interposed therebetween is measured at intervals of 1 m over the entire length of the magnetic tape. A region sandwiched between two adjacent servo bands is referred to as a data band. In the measurement for obtaining TDSage and TDSenv according to the embodiment of the present invention and the present specification, a value of the tension applied in the longitudinal direction of the magnetic tape is set to a set value set in the magnetic tape apparatus. In addition, in the embodiment of the present invention and the present specification, in "1 m interval measurement", in a case where one terminal of a measurement target region is defined as a position of 0 m, each position in a direction toward the other terminal is defined as 1 m, 2 m, 3 m, . . . , and the other terminal is defined as L m with respect to the measurement target region having a length of L meters (m), a first measurement position is a position of 1 m, and a last measurement position is one position before a position of L m. In addition, in a case in which there are a plurality of servo band intervals, the servo band interval is measured in the same manner for entire servo band interval. The servo band interval measured in this way is defined as a "servo band interval before storage" at each measurement position.

Then, the magnetic tape cartridge is stored in a storage environment of an atmosphere temperature of 60° C. and a relative humidity of 20% for 36 hours. The present inventors consider that this storage may correspond to long-term storage for about 10 years in an environment of an atmosphere temperature of 32° C. and a relative humidity of 55%.

After such storage, after the above-described magnetic tape cartridge is placed in a measurement environment of an atmosphere temperature of 23° C. and a relative humidity of 50% for 5 days, in the same measurement environment, in a magnetic tape apparatus including a tension adjusting mechanism for applying a tension in the longitudinal direction of the magnetic tape, the magnetic tape is allowed to run in a state where a tension of 0.7 N is applied in the longitudinal direction of the magnetic tape. For such running, the servo band interval is measured in the same manner as in the method described above. The servo band interval measured in this way is defined as "servo band interval after storage" at each measurement position.

For the entire servo band interval, a difference between the servo band interval before the storage and the servo band interval after the storage measured at intervals of 1 m is obtained. In this way, a plurality of values of the difference are obtained. A maximum value of an absolute value of the obtained difference is defined as "TDSage" of the magnetic tape to be measured.

The interval between two servo bands adjacent to each other with the data band interposed therebetween can be obtained, for example, by using a position error signal (PES) obtained from a servo signal acquired by reading a servo pattern with a servo signal reading element. With respect to details, the description of the Examples below can be referred to.

<Method for Measuring TDSenv>

TDSenv is obtained by the following method.

For each measurement environment, the magnetic tape cartridge accommodating the magnetic tape to be measured is placed in the measurement environment for 5 days in order to make the magnetic tape fit into the measurement environment. The measurement environment is the five environments described above (that is, the temperature of 16° C. and the relative humidity of 20%, the temperature of 16° C. and the relative humidity of 80%, the temperature of 26° C. and the relative humidity of 80%, the temperature of 32° C. and the relative humidity of 20%, and the temperature of 32° C. and the relative humidity of 55%).

After that, in a magnetic tape apparatus including a tension adjusting mechanism for applying a tension in a longitudinal direction of the magnetic tape in the measurement environment, the magnetic tape is allowed to run in a state where a tension of 0.7 N is applied in the longitudinal direction of the magnetic tape. Regarding the magnetic tape, a terminal on a side wound around a reel of the magnetic tape cartridge is referred to as an inner terminal, and a terminal on the opposite side is referred to as an outer terminal, the outer terminal is set to 0 m, and in a region having a length of 0 m to 100 m (hereinafter, referred to as a "100 m region along the reel outer periphery") at intervals of 1 m, the servo band interval in a data band 0 (zero) is measured at intervals of 1 m in the running. The "data band 0" is a data band determined as a data band in which data is first embedded (recorded) according to the standard. An arithmetic average of the measured servo band intervals is set as the servo band interval in the measurement environment.

After obtaining the servo band interval in each of the five environments as described above, a value calculated as "(maximum value-minimum value)×½" by using the maximum value and the minimum value among the obtained values is defined as "TDSenv" of the magnetic tape to be measured.

A method of measuring TC will be described later.

<Expression 1>

Expression 1 is as follows.

$$\text{TDSage}+\text{TDSenv}-TC \leq 0.10 \ \mu m \qquad \text{(Expression 1)}$$

The measurement methods of "TDSage" and "TDSenv" for the magnetic tape in order to obtain Expression 1 are as described above. In a case of obtaining these two values for the magnetic tape to be measured, the measurement of "TDSage" is first performed. Then, "TDSenv" is measured.

The magnetic tape satisfies Expression 1. As a result of intensive studies by the present inventors, it has been newly found that the magnetic tape satisfying Expression 1 is a magnetic tape suitable for a magnetic tape apparatus that performs recording and/or reproducing of data by changing a head tilt angle during the running of the magnetic tape. Specifically, the magnetic tape can contribute to suitably performing recording and/or reproducing during a case of performing the recording and/or reproducing of data by changing the head tilt angle during the running of the magnetic tape after the long-term storage. From this point, a value of the left side of Expression 1 is 0.10 μm or less, preferably 0.08 μm or less, more preferably 0.05 μm or less, still more preferably 0.03 μm or less, and even still more preferably 0.01 μm or less. In one aspect, the value on the left side of Expression 1 can be 0.00 μm, and can also be 0.00 μm or more, or more than 0.00 μm.

Regarding Expression 1, for example, the value on the left side of Expression 1 can be adjusted by the thickness of the magnetic tape, the strength (for example, Young's modulus) of the non-magnetic support, the moisture content of the non-magnetic support, manufacturing conditions of the magnetic tape, and the like. Regarding this point, the description below can be referred to.

The above-described magnetic tape may satisfy Expression 1, and the values of TDSage, TDSenv, and TC are not particularly limited.

In one aspect, TDSage may be 0.00 μm or more, more than 0.00 μm, 0.05 μm or more, 0.10 μm or more, or 0.30 μm or more, and may be 3.00 μm or less, 2.50 μm or less, 2.00 μm or less, or 1.50 μm or less. TDSage can be adjusted, for example, by manufacturing conditions of the magnetic tape.

In one aspect, TDSenv can be 0.00 μm or more, more than 0.00 μm, 0.05 μm or more, or 0.10 μm or more, and can be 2.00 μm or less, 1.50 μm or less, or 1.00 μm or less. TDSenv can be adjusted by, for example, the strength (for example, Young's modulus) of the non-magnetic support, the moisture content of the non-magnetic support, and the like.

<Non-Magnetic Support>

The magnetic tape includes a polyethylene naphthalate support having a Young's modulus in a width direction of 10000 mega pascal (MPa) or more as a non-magnetic support (hereinafter, also simply referred to as a "support").

Polyethylene naphthalate (PEN) is a resin including a naphthalene ring and a plurality of ester bonds (that is, a polyester including a naphthalene ring), and can be obtained by performing an esterification reaction of 2,6-naphthalenedicarboxylic acid dimethyl and ethylene glycol, and then performing an ester exchange reaction and a polycondensation reaction. The term "polyethylene naphthalate" in the present invention and the present specification includes those having a structure having one or more other components (for example, a copolymer component, a component introduced into a terminal or a side chain, or the like) in addition to the above component. In the embodiment of the present invention and the present specification, the "polyethylene naphthalate support" means a support including at least one layer of a polyethylene naphthalate film. The "polyethylene naphthalate film" refers to a film in which a component occupying the largest mass among components constituting the film is polyethylene naphthalate. The "polyethylene naphthalate support" in the embodiment of the present invention and the present specification includes a support in which all of the resin films included in the support are polyethylene naphthalate films, and a support that includes a polyethylene naphthalate film and other resin films. Specific examples of the polyethylene naphthalate support include a single-layer polyethylene naphthalate film, a laminated film of two or more layers of polyethylene naphthalate films having the same constitutional component, a laminated film of two or more layers of polyethylene naphthalate films having different constitutional components, and a laminated film including one or more polyethylene naphthalate films and one or more resin films other than polyethylene naphthalate. An adhesive layer or the like may be optionally included between two adjacent layers in the laminated film. In addition, the polyethylene naphthalate support may optionally include a metal film and/or a metal oxide film formed on one or both surfaces by vapor deposition or the like.

The non-magnetic support may be a biaxially stretched film, and may be a film that has been subjected to corona discharge, a plasma treatment, an easy-bonding treatment, a heat treatment, or the like.

In the present invention and the present specification, the Young's modulus of the non-magnetic support is a value to be measured by the following method in a measurement environment with a temperature of 23° C. and a relative humidity of 50%. The Young's modulus shown in the table below is a value obtained by the following method using Tensilon manufactured by Toyo Baldwin Co., Ltd. as a universal tensile test device.

A sample piece cut out from the non-magnetic support to be measured is pulled by a universal tensile test device under the conditions of a distance between chucks of 100 mm, a tensile speed of 10 mm/min, and a chart speed of 500 mm/min. As the universal tensile test device, for example, a commercially available universal tensile test device such as Tensilon manufactured by Toyo Baldwin Co., Ltd. or a universal tensile test device having a well-known configuration can be used. Young's moduli in a longitudinal direction and a width direction of the sample piece are calculated from a tangent line of a rising portion of a load-elongation curve thus obtained. Here, the longitudinal direction and the width direction of the sample piece mean a longitudinal direction and a width direction in a case where the sample piece is included in the magnetic tape.

For example, after removing portions, such as the magnetic layer, other than the non-magnetic support from the magnetic tape by a well-known method (for example, film removal using an organic solvent), the Young's moduli in the longitudinal direction and the width direction of the non-magnetic support can be obtained by the above method.

A Young's modulus of the polyethylene naphthalate support in the width direction is 10000 MPa or more. The present inventors consider that the inclusion of such a non-magnetic support in the magnetic tape may contribute to reducing the value on the left side of Expression 1. The Young's modulus of the polyethylene naphthalate support in the width direction can be, for example, 11000 MPa or more. In addition, the Young's modulus in the width direction of the polyethylene naphthalate support may be, for example, 20000 MPa or less, 18000 MPa or less, 16000 MPa or less, or 14000 MPa or less, and may exceed the value described here as an example.

The polyethylene naphthalate support may have a Young's modulus in the width direction of 10000 MPa or more, and the Young's modulus in the longitudinal direction is not particularly limited. In one aspect, the Young's modulus in the longitudinal direction of the polyethylene naphthalate support is preferably 2500 MPa or more and more preferably 3000 MPa or more. In addition, the Young's modulus in the longitudinal direction of the polyethylene naphthalate support can be, for example, 10000 MPa or less, 9000 MPa or less, 8000 MPa or less, 7000 MPa or less, or 6000 MPa or less. In a case where the magnetic tape is manufactured, the non-magnetic support is usually used in a machine direction (MD direction) as the longitudinal direction and a transverse direction (TD direction) as the width direction of the film. The Young's modulus in the longitudinal direction and the Young's modulus in the width direction of the non-magnetic support can have the same value in one aspect, and can have different values in other aspects. In one aspect, the Young's modulus in the width direction of the polyethylene naphthalate support may be a value greater than the Young's modulus in the longitudinal direction.

Examples of an indicator of physical properties of the non-magnetic support also include a moisture content. In the present invention and the present specification, a moisture content of the non-magnetic support is a value obtained by the following method. The moisture content shown in the table below is a value obtained by the following method.

A sample piece (for example, a sample piece having a mass of a few grams) cut out from the non-magnetic support of which the moisture content is to be measured is dried in a vacuum dryer at a temperature of 180° C. and a pressure of 100 Pa (Pascal) or less until the sample piece has a constant weight. A mass of the sample piece thus dried is defined as W1. W1 is a value measured in a measurement environment of a temperature of 23° C. and a relative humidity of 50% within 30 seconds after the sample piece is taken out from the vacuum dryer. Next, a mass of this sample piece after being left under an environment of a temperature of 25° C. and a relative humidity of 75% for 48 hours is defined as W2. W2 is a value measured in a measurement environment of a temperature of 23° C. and a relative humidity of 50% within 30 seconds after the sample piece is taken out from the environment. The moisture content is calculated by the following equation.

$$\text{Moisture content } (\%) = [(W2 - W1)/W1] \times 10^0$$

For example, after removing portions, such as the magnetic layer, other than the non-magnetic support from the magnetic tape by a well-known method (for example, film removal using an organic solvent), the moisture content of the non-magnetic support can be obtained by the above method.

In one aspect, the moisture content of the non-magnetic support of the magnetic tape is preferably 1.0% or less, more preferably 0.8% or less, and still more preferably 0.6 or less. In addition, the moisture content of the non-magnetic support of the magnetic tape may be 0%, 0% or more, more than 0%, or 0.1% or more. In a case where a non-magnetic support having a low moisture content is used, the value of TDSenv tends to decrease.

The moisture content and the Young's modulus of the non-magnetic support can be controlled by the types and mixing ratios of the components constituting the support, the manufacturing conditions of the support, and the like. For example, the Young's modulus in the longitudinal direction and the Young's modulus in the width direction can be controlled respectively by adjusting a stretching ratio in each direction in a biaxial stretching treatment.

<Magnetic Layer>

(Ferromagnetic Powder)

As ferromagnetic powder contained in the magnetic layer, a well-known ferromagnetic powder as ferromagnetic powder used in magnetic layers of various magnetic recording media can be used alone or in combination of two or more. From the viewpoint of improving recording density, it is preferable to use ferromagnetic powder having a small average particle size. From this point, the average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from the viewpoint of magnetization stability, the average particle size of the ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferred specific examples of the ferromagnetic powder include a hexagonal ferrite powder. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and the present specification, the term "hexagonal ferrite powder" refers to ferromagnetic powder in which a hexagonal ferrite crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite crystal structure in an X-ray diffraction spectrum obtained by X-ray diffraction analysis, it is determined that the hexagonal ferrite crystal structure is detected as the main phase. In a case where only a single structure is detected by X-ray diffraction analysis, this detected structure is taken as the main phase. The hexagonal ferrite crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, and a lead atom. In the present invention and the present specification, a hexagonal strontium ferrite powder refers to a powder in which a main divalent metal atom is a strontium atom, and a hexagonal barium ferrite powder refers to a powder in which a main divalent metal atom is a barium atom. The main divalent metal atom refers to a divalent metal atom that accounts for the most on an at % basis among the divalent metal atoms included in the powder. Note that a rare earth atom is not included in the above divalent metal atom. The term "rare earth atom" in the present invention and the present specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is one aspect of the hexagonal ferrite powder, will be described in more detail.

An activation volume of the hexagonal strontium ferrite powder is preferably in a range of 800 to 1600 nm$^3$. The finely granulated hexagonal strontium ferrite powder having an activation volume in the above range is suitable for manufacturing a magnetic tape exhibiting excellent electromagnetic conversion characteristics. The activation volume of the hexagonal strontium ferrite powder is preferably 800 nm$^3$ or more, and may be, for example, 850 nm$^3$ or more. Further, from the viewpoint of further improving the electromagnetic conversion characteristics, the activation volume of the hexagonal strontium ferrite powder is more preferably 1500 nm$^3$ or less, still more preferably 1400 nm$^3$ or less, still more preferably 1300 nm$^3$ or less, still more preferably 1200 nm$^3$ or less, and still more preferably 1100 nm$^3$ or less. The same applies to an activation volume of the hexagonal barium ferrite powder.

The term "activation volume" refers to a unit of magnetization reversal and is an index indicating the magnetic size of a particle. An activation volume described in the present invention and the present specification and an anisotropy constant Ku which will be described below are values obtained from the following relational expression between a coercivity Hc and an activation volume V, by performing measurement in a coercivity Hc measurement portion at a magnetic field sweep rate of 3 minutes and 30 minutes using a vibrating sample magnetometer (measurement temperature: 23° C.±1° C.). For a unit of the anisotropy constant Ku, 1 erg/cc=1.0×10$^{-1}$ J/m$^3$.

$$Hc=2Ku/Ms\{1-[(kT/KuV)\ln(At/0.693)]^{1/2}\}$$

[In the above expression, Ku: anisotropy constant (unit: J/m$^3$), Ms: saturation magnetization (unit: kA/m), k: Boltzmann constant, T: absolute temperature (unit: K), V: activation volume (unit: cm$^3$), A: spin precession frequency (unit: s$^{-1}$), t: magnetic field reversal time (unit: s)]

An index for reducing thermal fluctuation, in other words, for improving the thermal stability may include the anisotropy constant Ku. The hexagonal strontium ferrite powder preferably has Ku of 1.8×10$^5$ J/m$^3$ or more, and more preferably has Ku of 2.0×10$^5$ J/m$^3$ or more. Ku of the hexagonal strontium ferrite powder may be, for example, 2.5×10$^5$ J/m$^3$ or less. Here, since higher Ku means higher thermal stability, which is preferable, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In one aspect, the hexagonal strontium ferrite powder including a rare earth atom may have a rare earth atom surface layer portion uneven distribution property. In the present invention and the present specification, the "rare earth atom surface layer portion uneven distribution property" means that a rare earth atom content with respect to 100 at % of an iron atom in a solution obtained by partially dissolving the hexagonal strontium ferrite powder with an acid (hereinafter, referred to as a "rare earth atom surface layer portion content" or simply a "surface layer portion content" for a rare earth atom.) and a rare earth atom content with respect to 100 at % of an iron atom in a solution obtained by totally dissolving the hexagonal strontium ferrite powder with an acid (hereinafter, referred to as a "rare earth atom bulk content" or simply a "bulk content" for a rare earth atom.) satisfy a ratio of a rare earth atom surface layer portion content/a rare earth atom bulk content>1.0.

A rare earth atom content in the hexagonal strontium ferrite powder described below is synonymous with the rare earth atom bulk content. On the other hand, partial dissolution using an acid dissolves a surface layer portion of a particle constituting the hexagonal strontium ferrite powder, and thus, a rare earth atom content in a solution obtained by partial dissolution is a rare earth atom content in a surface layer portion of a particle constituting the hexagonal strontium ferrite powder. A rare earth atom surface layer portion content satisfying a ratio of "rare earth atom surface layer portion content/rare earth atom bulk content>1.0" means that in a particle constituting the hexagonal strontium ferrite powder, rare earth atoms are unevenly distributed in a surface layer portion (that is, more than an inside). The surface layer portion in the present invention and the present specification means a partial region from a surface of a particle constituting the hexagonal strontium ferrite powder toward an inside.

In a case where the hexagonal strontium ferrite powder includes the rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle constituting the hexagonal strontium ferrite powder contribute to suppression of a decrease in reproduction output during repeated reproduction. It is supposed that this is because the hexagonal strontium ferrite powder includes a rare earth atom with a bulk content in the above range, and rare earth atoms are unevenly distributed in a surface layer portion of a particle constituting the hexagonal strontium ferrite powder, and thus it is possible to increase an anisotropy constant Ku. The higher a value of an anisotropy constant Ku is, the more a phenomenon called thermal fluctuation can be suppressed (in other words, thermal stability can be improved). By suppressing occurrence of thermal fluctuation, it is possible to suppress a decrease in reproduction output during repeated reproduction. It is supposed that uneven distribution of rare earth atoms in a particulate surface layer portion of the hexagonal strontium ferrite powder contributes to stabilization of spins of iron (Fe) sites in a crystal lattice of a surface layer portion, and thus, an anisotropy constant Ku may be increased.

Moreover, it is supposed that the use of the hexagonal strontium ferrite powder having a rare earth atom surface layer portion uneven distribution property as ferromagnetic powder in the magnetic layer also contributes to inhibition of a magnetic layer surface from being scraped by being slid with respect to the magnetic head. That is, it is supposed that the hexagonal strontium ferrite powder having a rare earth atom surface layer portion uneven distribution property can also contribute to an improvement of running durability of the magnetic tape. It is supposed that this may be because uneven distribution of rare earth atoms on a surface of a particle constituting the hexagonal strontium ferrite powder contributes to an improvement of interaction between the particle surface and an organic substance (for example, a binding agent and/or an additive) included in the magnetic layer, and, as a result, a strength of the magnetic layer is improved.

From the viewpoint of further suppressing a decrease in reproduction output during repeated reproduction and/or the viewpoint of further improving running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving the hexagonal strontium ferrite powder. In the embodiment of the present invention and the present specification, unless otherwise noted, the content of an atom means a bulk content obtained by totally dissolving the hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more types of rare earth atoms is obtained for the total of two or more types of rare earth atoms. This also applies to other components in the present invention and the present specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom need only be any one or more of rare earth atoms. As a rare earth atom that is preferable from the viewpoint of further suppressing a decrease in reproduction output during repeated reproduction, there are a neodymium atom, a samarium atom, an yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms need only be unevenly distributed in the surface layer portion of a particle constituting the hexagonal strontium ferrite powder, and the degree of uneven distribution is not limited. For example, for the hexagonal strontium ferrite powder having a rare earth atom surface layer portion uneven distribution property, a ratio of a surface layer portion content of a rare earth atom obtained by partial dissolution under dissolution conditions which will be described below to a bulk content of a rare earth atom obtained by total dissolution under dissolution conditions which will be described below, that is, "surface layer portion content/bulk content" exceeds 1.0 and may be 1.5 or more. The fact that "surface layer portion content/bulk content" is larger than 1.0 means that in a particle constituting the hexagonal strontium ferrite powder, rare earth atoms are unevenly distributed in the surface layer portion (that is, more than an inside). Further, a ratio of a surface layer portion content of a rare earth atom obtained by partial dissolution under dissolution conditions which will be described below to a bulk content of a rare earth atom obtained by total dissolution under the dissolution conditions which will be described below, that is, "surface layer portion content/bulk content" may be, for example, 10.0 or less, 9.0 or less, 8.0 or less, 7.0 or less, 6.0 or less, 5.0 or less, or 4.0 or less. Note that, in the hexagonal strontium ferrite powder having a rare earth atom surface layer portion uneven distribution property, the rare earth atoms need only be unevenly distributed in the surface layer portion of a particle constituting the hexagonal strontium ferrite powder, and the "surface layer portion content/bulk content" is not limited to the exemplified upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-91747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle constituting the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Note that the following dissolution conditions such as the amount of sample powder are exemplified, and dissolution conditions for partial dissolution and total dissolution can be employed in any manner.

A container (for example, a beaker) containing 12 mg of the sample powder and 10 mL of 1 mol/L hydrochloric acid is held on a hot plate at a set temperature of 70° C. for 1 hour. The obtained solution is filtered by a membrane filter of 0.1 μm. Elemental analysis of the filtrated solution thus obtained is performed by an inductively coupled plasma (ICP) analyzer. In this way, the surface layer portion content of a rare earth atom with respect to 100 at % of an iron atom can be obtained. In a case where a plurality of kinds of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of the sample powder and 10 mL of 4 mol/L hydrochloric acid is held on a hot plate at a set temperature of 80° C. for 3 hours. Thereafter, the same procedure as the partial dissolution and the measurement of the surface layer portion content is carried out, and the bulk content with respect to 100 at % of an iron atom can be obtained.

From the viewpoint of increasing the reproduction output in a case of reproducing data recorded on the magnetic tape, it is desirable that mass magnetization σs of the ferromagnetic powder included in the magnetic tape is high. In this regard, the hexagonal strontium ferrite powder including a rare earth atom but not having the rare earth atom surface layer portion uneven distribution property tends to have a larger decrease in σs than that of the hexagonal strontium ferrite powder including no rare earth atom. With respect to this, it is considered that the hexagonal strontium ferrite powder having a rare earth atom surface layer portion uneven distribution property is preferable in suppressing such a large decrease in σs. In one aspect, σs of the hexagonal strontium ferrite powder may be 45 A·m²/kg or more, and may be 47 A·m²/kg or more. On the other hand, from the viewpoint of noise reduction, σs is preferably 80 A·m²/kg or less and more preferably 60 A·m²/kg or less. σs can be measured using a well-known measuring device, such as a vibrating sample magnetometer, capable of measuring magnetic properties. In the present invention and the present specification, unless otherwise noted, the mass magnetization σs is a value measured at a magnetic field intensity of 15 kOe. 1 [KOe] is $10^6/4\pi$ [A/m].

Regarding the content (bulk content) of a constituent atom of the hexagonal strontium ferrite powder, a strontium atom content may be, for example, in a range of 2.0 to 15.0 at % with respect to 100 at % of an iron atom. In one aspect, the hexagonal strontium ferrite powder may include only a strontium atom as a divalent metal atom. In the other aspect, the hexagonal strontium ferrite powder can also include one or more kinds of other divalent metal atoms, in addition to the strontium atom. For example, a barium atom and/or a calcium atom may be included. In a case where the other divalent metal atoms other than the strontium atom are included, a content of the barium atom and a content of the calcium atom in the hexagonal strontium ferrite powder respectively can be, for example, in a range of 0.05 to 5.0 at % with respect to 100 at % of the iron atom.

As the hexagonal ferrite crystal structure, a magnetoplumbite type (also referred to as an "M type"), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to one aspect, in the hexagonal strontium ferrite powder, only the M-type crystal structure may be detected by X-ray diffraction analysis. For example, M type hexagonal ferrite is represented by a composition formula of $AFe_{12}O_{19}$. Here, A represents a divalent metal atom, and in a case where the hexagonal strontium ferrite powder is the M type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom may be, for example, 0.5 to 10.0 at % with respect to 100 at % of an iron atom. From the viewpoint of further suppressing a decrease in reproduction output during repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in one aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving the hexagonal strontium ferrite powder into a value expressed in at % using an atomic weight of each atom. Further, in the present invention and the present specification, the term "not include" for a certain atom means that a content measured by an ICP analyzer after total dissolution is 0 mass %. A detection limit of the ICP analyzer is usually 0.01 parts per million (ppm) or less on a mass basis. The term "not included" is used as a meaning including that an atom is included in an amount less than the detection limit of the ICP analyzer. In one aspect, the hexagonal strontium ferrite powder may not include a bismuth atom (Bi).

Metal Powder

Preferred specific examples of the ferromagnetic powder include ferromagnetic metal powder. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

Preferred specific examples of the ferromagnetic powder include an &-iron oxide powder. In the present invention and the present specification, the term "&-iron oxide powder" refers to ferromagnetic powder in which an ε-iron oxide crystal structure is detected as a main phase by X-ray diffraction analysis. For example, in a case where the highest intensity diffraction peak is attributed to an ε-iron oxide crystal structure in an X-ray diffraction spectrum obtained by X-ray diffraction analysis, it is determined that the ε-iron oxide crystal structure is detected as the main phase. As a method of manufacturing an ε-iron oxide powder, a manufacturing method from a goethite, a reverse micelle method, and the like are known. All of the manufacturing methods are well known. Regarding a method of manufacturing an ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred to, for example. Note that the method of manufacturing the ε-iron oxide powder capable of being used as the ferromagnetic powder in the magnetic layer of the magnetic tape is not limited to the methods described here.

An activation volume of the ε-iron oxide powder is preferably in a range of 300 to 1500 $nm^3$. The finely granulated ε-iron oxide powder having an activation volume in the above range is suitable for manufacturing a magnetic tape exhibiting excellent electromagnetic conversion characteristics. The activation volume of the ε-iron oxide powder is preferably 300 $nm^3$ or more, and may be, for example, 500 $nm^3$ or more. Further, from the viewpoint of further improving the electromagnetic conversion characteristics, the activation volume of the ε-iron oxide powder is more preferably 1400 $nm^3$ or less, still more preferably 1300 $nm^3$ or less, still more preferably 1200 $nm^3$ or less, and still more preferably 1100 $nm^3$ or less.

An index for reducing thermal fluctuation, in other words, for improving the thermal stability may include the anisotropy constant Ku. The ε-iron oxide powder preferably has Ku of $3.0\times10^4$ $J/m^3$ or more, and more preferably has Ku of $8.0\times10^4$ $J/m^3$ or more. Ku of the ε-iron oxide powder may be, for example, $3.0\times10^5$ $J/m^3$ or less. Here, since higher Ku means higher thermal stability, which is preferable, a value thereof is not limited to the values exemplified above.

From the viewpoint of increasing the reproduction output in a case of reproducing data recorded on the magnetic tape, it is desirable that mass magnetization σs of the ferromagnetic powder included in the magnetic tape is high. In this regard, in one aspect, σs of the ε-iron oxide powder may be 8 $A \cdot m^2/kg$ or more, and may be 12 $A \cdot m^2/kg$ or more. On the other hand, from the viewpoint of noise reduction, σs of the ε-iron oxide powder is preferably 40 $A \cdot m^2/kg$ or less and more preferably 35 $A \cdot m^2/kg$ or less.

In the present invention and the present specification, unless otherwise noted, an average particle size of various powders such as ferromagnetic powders is a value measured by the following method using a transmission electron microscope.

The powder is imaged at an imaging magnification of 100000× with a transmission electron microscope, the image is printed on photographic printing paper or displayed on a display so that the total magnification of 500000× to obtain an image of particles configuring the powder. A target particle is selected from the obtained image of particles, an outline of the particle is traced by a digitizer, and a size of the particle (primary particle) is measured. The primary particles are independent particles without aggregation.

The measurement described above is performed regarding 500 particles randomly extracted. An arithmetic average of the particle sizes of 500 particles thus obtained is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described below is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and the present specification, the powder means an aggregate of a plurality of particles. For example, the ferromagnetic powder means an aggregate of a plurality of ferromagnetic particles. Further, the aggregate of the plurality of particles not only includes an aspect in which particles constituting the aggregate directly come into contact with each other, but also includes an aspect in which a binding agent or an additive which will be described below is interposed between the particles. The term "particle" is used to describe a powder in some cases.

As a method of taking a sample powder from the magnetic tape in order to measure the particle size, a method disclosed in a paragraph 0015 of JP2011-048878A can be employed, for example.

In the embodiment of the present invention and the present specification, unless otherwise noted, (1) in a case where the shape of the particle observed in the particle image described above is a needle shape, a fusiform shape, or a columnar shape (here, a height is greater than a maximum major diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum major diameter of a plate surface or a bottom surface), the particle size is shown as a maximum major diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter is obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %, with respect to the total mass of the magnetic layer. A high filling percentage of the ferromagnetic powder in the magnetic layer is preferable from the viewpoint of improving the recording density.

(Binding Agent)

The magnetic tape can be a coating type magnetic tape, and include a binding agent in the magnetic layer. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below.

For the above binding agent, descriptions disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the embodiment of the present invention and the present specification is a value obtained by performing polystyrene conversion of a value measured by gel permeation chromatography (GPC) under the following measurement conditions. The weight-average molecular weight of the binding agent shown in Examples described below is a value obtained by performing polystyrene conversion of a value measured under the following measurement conditions. The binding agent may be used in an amount of, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: tetrahydrofuran (THF)

(Curing Agent)

A curing agent can also be used together with the resin which can be used as the binding agent. As the curing agent, in one aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. The curing reaction proceeds in a magnetic layer forming step, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in the composition for forming a magnetic layer in an amount of, for example, 0 to 80.0 parts by mass, and preferably 50.0 to 80.0 parts by mass from the viewpoint of improving a strength of the magnetic layer, with respect to 100.0 parts by mass of the binding agent.

(Additive)

The magnetic layer may include one or more kinds of additives, as necessary. As the additives, the curing agent described above is used as an example. In addition, examples of the additive which can be included in the magnetic layer include non-magnetic powder (for example, an inorganic powder or carbon black), a lubricant, a dispersing agent, a dispersing assistant, an antibacterial agent, an antistatic agent, an antioxidant, and the like. For example, for the lubricant, descriptions disclosed in paragraphs 0030 to 0033, 0035, and 0036 of JP2016-126817A can be referred to. The non-magnetic layer which will be described below may include a lubricant. For the lubricant which may be included in the non-magnetic layer, a description disclosed in paragraphs 0030, 0031, 0034 to 0036 of JP2016-126817A can be referred to. For the dispersing agent, descriptions disclosed in paragraphs 0061 and 0071 of JP2012-133837A can be referred to. The dispersing agent may be added to a composition for forming a non-magnetic layer. For the dispersing agent that can be added to the composition for forming a non-magnetic layer, a description disclosed in a paragraph 0061 of JP2012-133837A can be referred to. As the non-magnetic powder that can be contained in the magnetic layer, non-magnetic powder which can function as an abrasive, or non-magnetic powder which can function as a protrusion forming agent which forms protrusions appropriately protruded from the magnetic layer surface (for example, non-magnetic colloidal particles) is used. An average particle size of colloidal silica (silica colloidal particles) shown in Examples described below is a value obtained by a method disclosed as a measurement method of an average particle diameter in a paragraph 0015 of JP2011-048878A. As the additive, a commercially available product can be suitably selected or manufactured by a well-known method according to the desired properties, and any amount thereof can be used. As an example of the additive which may be used for improving dispersibility of the abrasive in the magnetic layer including the abrasive, a dispersing agent disclosed in paragraphs 0012 to 0022 of JP2013-131285A can be used.

The magnetic layer described above can be provided on a surface of the non-magnetic support directly or indirectly through the non-magnetic layer.

<Non-Magnetic Layer>

Next, the non-magnetic layer will be described. The above magnetic tape may have a magnetic layer directly on the surface of the non-magnetic support, or may have a magnetic layer on the surface of the non-magnetic support through a non-magnetic layer including non-magnetic powder. The non-magnetic powder used for the non-magnetic layer may be an inorganic substance powder or an organic substance powder. In addition, the carbon black and the like can be used. Examples of the inorganic substance include powders of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50 to 90 mass % and more preferably in a range of 60 to 90 mass %, with respect to the total mass of the non-magnetic layer.

The non-magnetic layer can include a binding agent, and can also include an additive. For other details of the binding agent or the additive of the non-magnetic layer, a well-known technology regarding the non-magnetic layer can be applied. In addition, in regards to the type and the content of the binding agent, and the type and the content of the additive, for example, the well-known technology regarding the magnetic layer can be applied.

The non-magnetic layer of the present invention and the present specification also includes a substantially non-magnetic layer including a small amount of ferromagnetic powder as impurities or intentionally, together with the non-magnetic powder. Here, the substantially non-magnetic layer is a layer having a residual magnetic flux density of 10 mT or smaller, a layer having a coercivity of 7.96 kA/m (100 Oe) or smaller, or a layer having a residual magnetic flux density of 10 mT or smaller and a coercivity of 7.96 kA/m (100 Oe) or smaller. It is preferable that the non-magnetic layer does not have a residual magnetic flux density and coercivity.

(Back Coating Layer)

The magnetic tape may or may not have a back coating layer including non-magnetic powder on a surface side of the non-magnetic support opposite to a surface side having the magnetic layer. The back coating layer preferably contains any one or both of carbon black and an inorganic powder. The back coating layer can include a binding agent and can also include an additive. Regarding the binding agent and additive in the back coating layer, a well-known technology for the back coating layer can be applied, and a well-known technology for the formulation of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

<Various Thicknesses>

Regarding a thickness (total thickness) of the magnetic tape, it has been required to increase the recording capacity (increase the capacity) of the magnetic tape with the enormous increase in the amount of information in recent years. As a unit for increasing the capacity, a thickness of the magnetic tape is reduced (hereinafter, also referred to as "thinning") and a length of the magnetic tape accommodated in one reel of the magnetic tape cartridge is increased. From this point, the thickness (total thickness) of the magnetic tape is preferably 5.6 μm or less, more preferably 5.5 μm or less, still more preferably 5.4 μm or less, still more preferably 5.3 μm or less, and still more preferably 5.2 μm or less. In addition, from the viewpoint of ease of handling, the thickness of the magnetic tape is preferably 3.0 μm or more, and more preferably 3.5 μm or more.

The thickness (total thickness) of the magnetic tape can be measured by the following method.

Ten tape samples (for example, 5 to 10 cm in length) are cut out from any part of the magnetic tape, and these tape samples are stacked to measure the thickness. A value (thickness per tape sample) obtained by dividing the measured thickness by $\frac{1}{10}$ is defined as the tape thickness. The thickness measurement can be performed using a well-known measuring instrument capable of measuring a thickness on the order of 0.1 μm.

The thickness of the non-magnetic support can be, for example, 3.0 μm or more, and can be, for example, 5.0 μm or less, 4.8 μm or less, 4.6 μm or less, 4.4 μm or less, or 4.2 μm or less.

A thickness of the magnetic layer can be optimized according to a saturation magnetization amount, a head gap length, and a band of a recording signal of the used magnetic head, is generally 0.01 μm to 0.15 μm, and, from the viewpoint of high-density recording, is preferably 0.02 μm to 0.12 μm and more preferably 0.03 μm to 0.1 μm. The magnetic layer need only be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 1.5 μm, and preferably 0.1 to 1.0 μm.

The thickness of the back coating layer is preferably 0.9 μm or less and more preferably 0.1 to 0.7 μm.

Various thicknesses such as the thickness of the magnetic layer and the like can be obtained by the following method.

A cross section of the magnetic tape in a thickness direction is exposed by an ion beam, and then the exposed cross section observation is performed using a scanning electron microscope or a transmission electron microscope. Various thicknesses can be obtained as an arithmetic average of thicknesses obtained at two optional points in the cross section observation. Alternatively, the various thicknesses can be obtained as a designed thickness calculated according to manufacturing conditions.

<Manufacturing Step>
(Preparation of Composition for Forming Each Layer)

A step of preparing a composition for forming the magnetic layer, the non-magnetic layer, or the back coating layer can usually include at least a kneading step, a dispersing step, and, as necessary, a mixing step provided before and after these steps. Each step may be divided into two or more stages. Components used for the preparation of composition for forming each layer may be added at an initial stage or in a middle stage of each step. As a solvent, one kind or two or more kinds of various solvents generally used for manufacturing a coating type magnetic recording medium can be used. For the solvent, for example, a description disclosed in a paragraph 0153 of JP2011-216149A can be referred to. In addition, each component may be separately added in two or more steps. For example, a binding agent may be added separately in a kneading step, a dispersing step, and a mixing step for adjusting a viscosity after dispersion. In order to manufacture the magnetic tape, a well-known manufacturing technology can be used in various steps. In the kneading step, an open kneader, it is preferable to use a continuous kneader, a pressure kneader, or a kneader having a strong kneading force such as an extruder. For details of the kneading treatment, descriptions disclosed in JP1989-106338A (JP-H1-106338A) and JP1989-79274A (JP-H1-79274A) can be referred to. As a disperser, a well-known disperser can be used. In any stage of preparing each layer forming composition, filtering may be performed by a well-known method. The filtering can be performed by using a filter, for example. As the filter used in the filtering, a filter having a pore diameter of 0.01 to 3 μm (for example, a filter made of glass fiber or a filter made of polypropylene) can be used, for example.

(Coating Step)

The magnetic layer can be formed by directly applying the composition for forming a magnetic layer onto the non-magnetic support surface or performing multilayer applying of the composition for forming a magnetic layer with the composition for forming a non-magnetic layer sequentially or simultaneously. The back coating layer can be formed by applying a composition for forming a back coating layer onto a surface of the non-magnetic support opposite to a surface having the non-magnetic layer and/or the magnetic layer (or to be provided with the non-magnetic layer and/or the magnetic layer). For details of the coating for forming each layer, a description disclosed in a paragraph 0066 of JP2010-231843A can be referred to.

(Other Steps)

Well-known technologies can be applied to other various steps for manufacturing the magnetic tape. Regarding the various steps, the descriptions disclosed in paragraphs 0067 to 0070 of JP2010-231843A can be referred to, for example. For example, a coating layer of the composition for forming a magnetic layer can be subjected to an alignment treatment in an alignment zone while the coating layer is in a wet state. For the alignment treatment, the various well-known technologies including a description disclosed in a paragraph 0052 of JP2010-24113A can be used. For example, a vertical alignment treatment can be performed by a well-known method such as a method using a polar opposing magnet. In the alignment zone, a drying speed of the coating layer can be controlled depending on a temperature of dry air and an air volume and/or a transportation speed in the alignment zone. Further, the coating layer may be preliminarily dried before the transportation to the alignment zone.

Through various steps, a long magnetic tape original roll can be obtained. The obtained magnetic tape original roll is cut (slit) by a well-known cutter, for example, to have a width of the magnetic tape to be wound in the magnetic tape cartridge. The width is determined according to the standard and is usually ½ inches. 1 inch=12.65 mm.

A servo pattern is formed on the magnetic tape obtained by slitting. Details of the servo pattern will be described below.

(Heat Treatment)

In one aspect, the magnetic tape can be a magnetic tape manufactured through the following heat treatment. In a case where the following heat treatment is performed, the value of TDSage tends to decrease.

As the heat treatment, the magnetic tape slit and cut to have a width determined according to the standard described above can be wound around a core member and can be subjected to the heat treatment in the wound state.

In one aspect, the heat treatment is performed in a state where the magnetic tape is wound around a core member for the heat treatment (hereinafter, referred to as a "winding core for heat treatment"), the magnetic tape after the heat treatment is wound around a reel of the magnetic tape cartridge, and the magnetic tape cartridge in which the magnetic tape is wound around the reel can be produced.

The winding core for heat treatment can be formed of metal, a resin, or paper. The material of the winding core for heat treatment is preferably a material having high stiffness, from the viewpoint of suppressing the occurrence of winding failure such as spoking. From this point, the winding core for heat treatment is preferably formed of metal or a resin. In addition, as an index of stiffness, a bending elastic modulus of the material of the winding core for the heat treatment is preferably 0.2 GPa or more, more preferably 0.3 GPa or more. Meanwhile, since the material having high stiffness is generally expensive, the use of the winding core for heat treatment of the material having stiffness exceeding the stiffness capable of suppressing the occurrence of the winding failure leads to an increase in cost. Considering the above point, the bending elastic modulus of the material of the winding core for heat treatment is preferably 250 GPa or less. The bending elastic modulus is a value measured in accordance with international organization for standardization (ISO) 178, and the bending elastic modulus of various materials is well-known. In addition, the winding core for heat treatment can be a solid or hollow core member. In a case of the hollow core member, a thickness thereof is preferably 2 mm or more from the viewpoint of maintaining stiffness. In addition, the winding core for heat treatment may include or may not include a flange.

It is preferable to prepare a magnetic tape having a length equal to or more than a length to be finally accommodated in the magnetic tape cartridge (hereinafter, referred to as a "final product length") as the magnetic tape wound around the winding core for heat treatment, and to perform the heat treatment by placing the magnetic tape in a heat treatment environment while being wound around the winding core for heat treatment. The length of the magnetic tape wound around the winding core for heat treatment is equal to or more than the final product length, and is preferably the "final product length+α", from the viewpoint of ease of winding around the winding core for heat treatment. This α is preferably 5 m or more, from the viewpoint of ease of the winding. The tension during winding around the winding core for heat treatment is preferably 0.1 N (Newton) or more. In addition, from the viewpoint of suppressing the occurrence of excessive deformation, the tension during winding around the winding core for heat treatment is preferably 1.5 N or less, and more preferably 1.0 N or less.

An outer diameter of the winding core for heat treatment is preferably 20 mm or more and more preferably 40 mm or more, from the viewpoint of ease of the winding and suppression of coiling (curling in longitudinal direction). In addition, the outer diameter of the winding core for heat treatment is preferably 100 mm or less, and more preferably 90 mm or less. A width of the winding core for heat treatment need only be equal to or more than the width of the magnetic tape wound around this winding core. In addition, in a case where the magnetic tape is removed from the winding core for heat treatment after the heat treatment, it is preferable to remove the magnetic tape from the winding core for heat treatment after the magnetic tape and the winding core for heat treatment are sufficiently cooled, in order to suppress occurrence of unintended deformation of the tape during the removal operation. It is preferable that the removed magnetic tape is once wound around another winding core (referred to as a "temporary winding core"), and then the magnetic tape is wound around the reel (generally, an outer diameter is about 40 to 50 mm.) of the magnetic tape cartridge from the temporary winding core. As a result, the magnetic tape can be wound around the reel of the magnetic tape cartridge while maintaining a relationship between the inner side and the outer side with respect to the winding core for heat treatment of the magnetic tape during the heat treatment. Regarding the details of the temporary winding core and the tension in a case of winding the magnetic tape around the winding core, the description described above regarding the winding core for heat treatment can be referred to. In an aspect in which the heat treatment is applied to the magnetic tape having a length of the "final product length+$\alpha$", the length corresponding to "+$\alpha$" need only be cut off in any stage. For example, in one aspect, the magnetic tape for the final product length need only be wound around the reel of the magnetic tape cartridge from the temporary winding core, and the remaining length corresponding to "+$\alpha$" need only be cut off. From the viewpoint of reducing a portion to be cut off and discarded, the $\alpha$ is preferably 20 m or less.

A specific aspect of the heat treatment performed in a state where the magnetic tape is wound around the core member as described above will be described below.

An atmosphere temperature at which the heat treatment is performed (hereinafter, referred to as a "heat treatment temperature") is preferably 40° C. or higher, and more preferably 50° C. or higher. On the other hand, from the viewpoint of suppressing excessive deformation, the heat treatment temperature is preferably 75° C. or lower, more preferably 70° C. or lower, and still more preferably 65° C. or lower.

A weight-basis absolute humidity of an atmosphere in which the heat treatment is performed is preferably 0.1 g/kg Dry air or more, and more preferably 1 g/kg Dry air or more. An atmosphere having a weight-basis absolute humidity in the above range is preferable because it can be prepared without using a special device for reducing moisture. On the other hand, the weight-basis absolute humidity is preferably 70 g/kg Dry air or less, and more preferably 66 g/kg Dry air or less, from the viewpoint of suppressing occurrence of dew condensation and deterioration of workability. A heat treatment time is preferably 0.3 hours or longer, and more preferably 0.5 hours or longer. In addition, the heat treatment time is preferably 48 hours or less, from the viewpoint of production efficiency.

(Formation of Servo Pattern)

The term "formation of servo pattern" can also be referred to as "recording of servo signal". The formation of the servo pattern will be described below.

The servo pattern is usually formed along a longitudinal direction of the magnetic tape. Examples of control (servo control) systems using a servo signal include a timing-based servo (TBS), an amplitude servo, and a frequency servo.

As shown in a European computer manufacturers association (ECMA)-319 (June 2001), a magnetic tape conforming to a linear tape-open (LTO) standard (generally called "LTO tape") employs a timing-based servo system. In this timing-based servo system, the servo pattern is formed by continuously arranging a plurality of pairs of non-parallel magnetic stripes (also referred to as "servo stripes") in the longitudinal direction of the magnetic tape. In the present invention and the present specification, the term "timing-based servo pattern" refers to a servo pattern that enables head tracking in a timing-based servo system. As described above, the reason why the servo pattern is formed of a pair of non-parallel magnetic stripes is to indicate, to a servo signal reading element passing over the servo pattern, a passing position thereof. Specifically, the pair of magnetic stripes is formed such that an interval thereof continuously changes along a width direction of the magnetic tape, and the servo signal reading element reads the interval to thereby sense a relative position between the servo pattern and the servo signal reading element. Information on this relative position enables tracking on a data track. Accordingly, a plurality of servo tracks are usually set on the servo pattern along the width direction of the magnetic tape.

A servo band is formed of a servo pattern continuous in the longitudinal direction of the magnetic tape. A plurality of the servo bands are usually provided on the magnetic tape. For example, in an LTO tape, the number of the servo bands is five. A region sandwiched between two adjacent servo bands is a data band. The data band is formed of a plurality of data tracks and each data track corresponds to each servo track.

Further, in one aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

In a method of uniquely specifying the servo band, a staggered method as shown in ECMA-319 (June 2001) is used. In this staggered method, a group of pairs of non-parallel magnetic stripes (servo stripes) arranged continuously in plural in a longitudinal direction of the magnetic tape is recorded to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Note that, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming a servo pattern is called a servo write head. The servo write head usually has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two additional methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-53940A, in a case where the magnetic pattern is transferred to, using the gap, a magnetic tape that has been subjected to the vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

The magnetic tape can be accommodated in, for example, a magnetic tape cartridge. The magnetic tape cartridge accommodating the magnetic tape can be mounted on the magnetic tape apparatus.

<Vertical Squareness Ratio>

In one aspect, a vertical squareness ratio of the magnetic tape may be, for example, 0.55 or more, and is preferably 0.60 or more. From the viewpoint of improving the electromagnetic conversion characteristics, it is preferable that the vertical squareness ratio of the magnetic tape is 0.60 or more. In principle, the upper limit of the squareness ratio is 1.00 or less. The vertical squareness ratio of the magnetic tape may be 1.00 or less, 0.95 or less, 0.90 or less, 0.85 or less, or 0.80 or less. From the viewpoint of improving the electromagnetic conversion characteristics, a large value of the vertical squareness ratio of the magnetic tape is preferable. The vertical squareness ratio of the magnetic tape can be controlled by a well-known method such as performing a vertical alignment treatment.

In the present invention and the present specification, the term "vertical squareness ratio" refers to a squareness ratio measured in the vertical direction of the magnetic tape. The term "vertical direction" described regarding the squareness ratio refers to a direction orthogonal to the magnetic layer surface, and can also be referred to as a thickness direction. In the present invention and the present specification, the vertical squareness ratio is obtained by the following method.

A sample piece having a size capable of being introduced into a vibrating sample magnetometer is cut out from the magnetic tape to be measured. For this sample piece, using a vibrating sample magnetometer, a magnetic field is applied in the vertical direction (direction orthogonal to the magnetic layer surface) of the sample piece at a maximum applied magnetic field of 3979 kA/m, a measurement temperature of 296 K, and a magnetic field sweeping speed of 8.3 kA/m/sec, and the magnetization strength of the sample piece with respect to the applied magnetic field is measured. The measured value of the magnetization strength is obtained as a value after demagnetic field correction and as a value obtained by subtracting the magnetization of a sample probe of the vibrating sample magnetometer as a background noise. Assuming that the magnetization strength at the maximum applied magnetic field is Ms and the magnetization intensity at zero applied magnetic field is Mr, a squareness ratio SQ is a value calculated as SQ=Mr/Ms. The measurement temperature refers to a temperature of the sample piece, and, by setting an atmosphere temperature around the sample piece to a measurement temperature, the temperature of the sample piece can be set to a measurement temperature by establishing a temperature equilibrium.

<Magnetic Tape Cartridge>

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic tape apparatus for recording and/or reproducing data on the magnetic tape, the magnetic tape is pulled out of the magnetic tape cartridge to be wound around the reel on the magnetic tape apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic tape apparatus side. During this time, for example, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge.

In one aspect, the magnetic tape cartridge may include a cartridge memory. The cartridge memory can be, for example, a non-volatile memory, and angle θ adjustment information is already recorded or the angle θ adjustment information is recorded. The angle θ adjustment information is information for adjusting an angle θ during the running of the magnetic tape in the magnetic tape apparatus. For example, as the angle θ adjustment information, a value of a servo band interval at each position in the longitudinal direction of the magnetic tape during data recording can be recorded. For example, in a case of reproducing the data recorded on the magnetic tape, the value of the servo band interval can be measured during reproduction, and the angle θ can be changed by a control device of the magnetic tape apparatus such that the absolute value of the difference from the servo band interval during recording at the same longitudinal position recorded in the cartridge memory approaches zero.

The magnetic tape and the magnetic tape cartridge may be suitably used in a magnetic tape apparatus (in other words, a magnetic recording and reproducing system) that records and/or reproduces data by changing the head tilt angle during running of the magnetic tape.

Hereinafter, the description will be made with reference to the accompanying drawings as appropriate. However, the present invention is not limited to the form shown in the drawings. In addition, the dimensions and the like of each part in the drawings are merely examples.

<Configuration of Magnetic Tape Apparatus>

In the magnetic tape apparatus, recording of data on the magnetic tape and/or reproduction of data recorded on the magnetic tape can be performed, for example, as the magnetic layer surface of the magnetic tape and the magnetic head come into contact with each other to be slid on each other. The magnetic tape apparatus can include, for example, a magnetic tape cartridge accommodating the magnetic tape, attachably and detachably.

In the present invention and the present specification, the term "magnetic tape apparatus" means an apparatus capable of performing at least one of the recording of data on the magnetic tape or the reproduction of data recorded on the magnetic tape. Such an apparatus is generally called a drive.

(Magnetic Head)

The magnetic head included in the above-described magnetic tape apparatus may have one or more modules including an element array with a plurality of magnetic head elements between a pair of servo signal reading elements, and may have two or more or three or more modules. The total number of such modules may be, for example, 5 or less, 4 or less, or 3 or less, and the modules as many as the number exceeding the total number illustrated here may be included in the magnetic head. Arrangement examples of a plurality of modules include "recording module–reproducing module" (total number of modules: 2), and "recording module–reproducing module-recording module" (total number of modules: 3). Note that the present invention is not limited to the examples shown here.

Each module includes an element array with a plurality of magnetic head elements between a pair of servo signal reading elements, that is, an arrangement of the elements. A module having a recording element as the magnetic head element is a recording module for recording data on the magnetic tape. A module having a reproducing element as the magnetic head element is a reproducing module for reproducing data recorded on the magnetic tape. In the magnetic head, a plurality of modules are arranged, for example, in a recording and reproducing head unit such that axes of the element arrays of the respective modules are oriented in parallel. Such a term "parallel" does not necessarily mean only parallel in a strict sense, but includes a range of errors normally allowed in the technical field to which the present invention belongs. The range of errors can mean, for example, a range less than strictly parallel ±10°.

In a case where the total number of modules included in the magnetic head is one, TC is obtained for this module. In a case where the total number of modules included in the magnetic head is two or more, TC is obtained for the randomly selected module. The module that acquires TC may be a recording module or a reproducing module.

As the reproducing element, a magnetoresistive (MR) element capable of reading information recorded on the magnetic tape with excellent sensitivity is preferable. As the MR element, various well-known MR elements (for example, a giant magnetoresistive (GMR) element and a tunnel magnetoresistive (TMR) element) can be used. Hereinafter, a magnetic head that records data and/or reproduces recorded data will also be referred to as a "recording and reproducing head". An element for recording data (recording element) and an element for reproducing data (reproducing element) are collectively referred to as a "magnetic head element".

By reproducing data using a reproducing element having a narrow reproducing element width as a reproducing element, data recorded at high-density can be reproduced with high sensitivity. From this viewpoint, the reproducing element width of the reproducing element is preferably 0.8 μm or less. The reproducing element width of the reproducing element may be, for example, 0.3 μm or more. Note that it is also preferable to be lower than this value from the above viewpoint.

Here, the term "reproducing element width" means a physical dimension of the reproducing element width. Such a physical dimension can be measured by an optical microscope, a scanning electron microscope, or the like.

In each element array, the pair of servo signal reading elements and the plurality of magnetic head elements (that is, the recording element or the reproducing element) are usually arranged linearly to be spaced from each other. Here, the term "arranged linearly" means that each magnetic head element is arranged on a straight line connecting a central portion of one servo signal reading element and a central portion of the other servo signal reading element. The term "axis of the element array" in the present invention and the present specification means a straight line connecting a central portion of one servo signal reading element and a central portion of the other servo signal reading element.

Hereinafter, a configuration of a module and the like will be further described with reference to the drawings. Note that the form shown in the drawings is an example and does not limit the present invention.

FIG. 1 is a schematic diagram showing an example of the module of the magnetic head. The module shown in FIG. 1 has a plurality of magnetic head elements between a pair of servo signal reading elements (servo signal reading elements 1 and 2). The magnetic head element is also referred to as a "channel". "Ch" in the figure is an abbreviation for channel. The module shown in FIG. 1 has a total of 32 magnetic head elements from Ch0 to Ch31.

The "L" for obtaining TC is a distance between the pair of servo signal reading elements, that is, a distance between one servo signal reading element and the other servo signal reading element. In the module shown in FIG. 1, "L" represents a distance between the servo signal reading element 1 and the servo signal reading element 2. Specifically, it is a distance between a central portion of the servo signal reading element 1 and a central portion of the servo signal reading element 2. Such a distance can be measured, for example, by an optical microscope or the like.

FIG. 2 is an explanatory diagram of a relative positional relationship between the module and the magnetic tape during running of the magnetic tape in the magnetic tape apparatus. In FIG. 2, the dotted line A indicates the width direction of the magnetic tape. The dotted line B indicates the axis of the element array. The angle $\theta$ can be referred to as a head tilt angle and is an angle formed by the dotted line A and the dotted line B. In a case where the angle $\theta$ is 0° during running of the magnetic tape, a distance in the magnetic tape width direction between one servo signal reading element and the other servo signal reading element in the element array (hereinafter, also referred to as "effective distance between servo signal reading elements") is "L". On the other hand, in a case where the angle $\theta$ exceeds 0°, the effective distance between the servo signal reading elements is "L cos $\theta$", where L cos $\theta$ is smaller than L. That is, "L cos $\theta$<L".

As described above, during recording or reproduction, in a case where the magnetic head for recording or reproducing data records or reproduces data while being deviated from a target track position due to the width deformation of the magnetic tape, a phenomenon such as overwriting of recorded data or reproduction failure may occur. For example, in a case where the width of the magnetic tape contracts or expands, a phenomenon may occur in which the magnetic head element, which should perform recording or reproduction at a target track position, performs recording or reproduction at a different track position. In addition, in a case where the width of the magnetic tape expands, the effective distance between the servo signal reading elements is also referred to as an interval between two servo bands adjacent to each other with the data band interposed therebetween (also referred to as "servo band interval" or "interval between servo bands". specifically, the distance between the two servo bands in the width direction of the magnetic tape), and a phenomenon may occur in which data is not recorded or reproduced at a portion close to the edge of the magnetic tape.

On the other hand, in a case where the element array is tilted at an angle $\theta$ exceeding 0°, the effective distance between the servo signal reading elements becomes "L cos $\theta$" as described above. The larger the value of 0, the smaller the value of L cos $\theta$, and the smaller the value of 0, the larger the value of L cos $\theta$. Therefore, by changing the value of 0 according to a degree of the dimension change (that is, contraction or extension) in the width direction of the magnetic tape, it is possible to make the effective distance between the servo signal reading elements approximate to or match with the interval between the servo bands. As a result, it is possible to prevent a phenomenon such as overwriting of recorded data or reproduction failure due to the fact that the magnetic head for recording or reproducing data records or reproduces data while being deviated from a target track position due to the width deformation of the magnetic tape during recording or reproduction, or to reduce a frequency of the occurrence of the phenomenon.

Therefore, in the magnetic tape apparatus, during the running of the magnetic tape in the magnetic tape apparatus, the angle $\theta$ formed by the axis of the element array with respect to the width direction of the magnetic tape is changed. For example, by providing the recording and reproducing head unit of the magnetic head with an angle adjustment unit for adjusting the angle of the module, the angle $\theta$ can be variably adjusted during running of the magnetic tape. Such an angle adjustment unit can include, for example, a rotation mechanism for rotating the module. A well-known technology can be applied to the angle adjustment unit.

Figure 3:
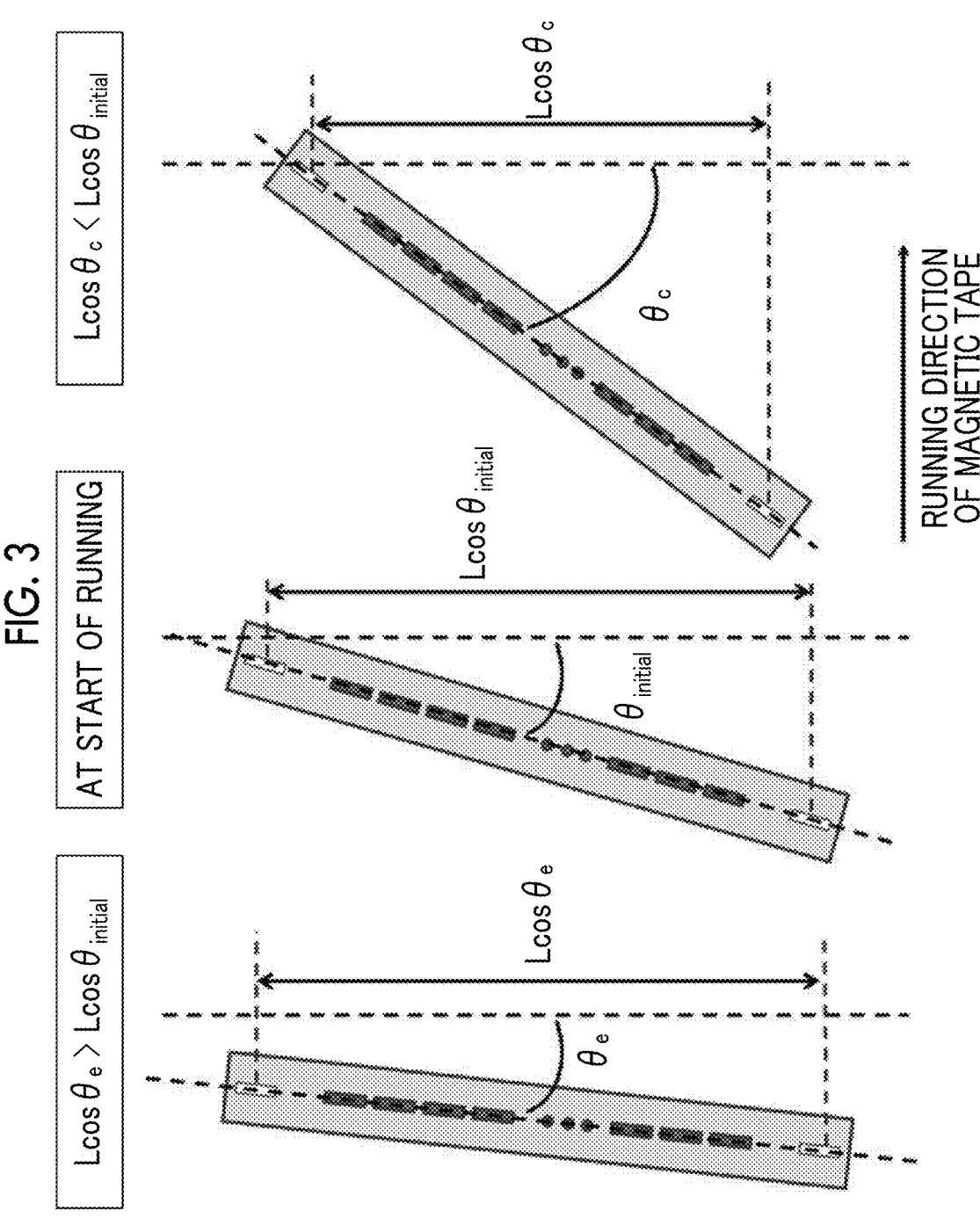
FIG. 3 is an explanatory diagram relating to a change in an angle θ during magnetic tape running.

FIG. 3 is an explanatory diagram relating to a change in the angle $\theta$ during running of the magnetic tape.

The angle $\theta$ at the start of running, $\theta_{initial}$ can be set to 0° or more or more than 0°. This is preferable in terms of adjustment ability to adjust the effective distance between the servo signal reading elements in response to the dimension change in the width direction of the magnetic tape, because the larger $\theta_{initial}$, the larger the amount of change in the effective distance between the servo signal reading elements with respect to the amount of change in the angle $\theta$. From this point, $\theta_{initial}$ is preferably 1.000° or more, more preferably 5.000° or more, and still more preferably 10.000° or more. On the other hand, for an angle (generally referred to as "wrap angle") formed between the magnetic layer surface and the contact surface of the magnetic head surface in a case where the magnetic tape runs and comes into contact with the magnetic head, it is effective to keep the deviation with respect to the tape width direction small in order to improve the uniformity in the tape width direction of the friction generated by the contact between the magnetic head and the magnetic tape during running of the magnetic tape. In addition, it is desirable to increase the uniformity of the friction in the tape width direction from the viewpoint of the position followability and the running stability of the magnetic head. From the viewpoint of reducing the deviation of the wrap angle in the tape width direction, $\theta_{initial}$ is preferably 45.000° or less, more preferably 40.000° or less, and still more preferably 35.000° or less.

$\theta_{initial}$, which is the head tilt angle at the start of running of the magnetic tape, can be set by a control device of the magnetic tape apparatus or the like.

In the example shown in FIG. 2 and FIG. 3, the axis of the element array is tilted in the running direction of the magnetic tape. Note that the present invention is not limited to such an example. In the above-described magnetic tape apparatus, an embodiment in which the axis of the element array is tilted in a direction opposite to the running direction of the magnetic tape is also included in the present invention. In the embodiment of the present invention and the present specification, the angle $\theta$ changes in a range of 0° to 90° during the running of the magnetic tape. That is, in a case where the axis of the element array is inclined toward the magnetic tape running direction at the start of running of the magnetic tape, the element array is not inclined such that the axis of the element array is inclined toward a direction opposite to the magnetic tape running direction at the start of running of the magnetic tape during the running of the magnetic tape. In addition, in a case in which the axis of the element array is inclined in a direction opposite to the magnetic tape running direction at the start of running of the magnetic tape, the element array is not inclined such that the axis of the element array is inclined in the magnetic tape running direction at the start of running of the magnetic tape during the running of the magnetic tape.

In FIG. 3, the central figure shows a state of the module at the start of running.

In FIG. 3, the right figure shows a state of the module in a case where the angle $\theta$ is set to an angle $\theta_c$, which is an angle larger than $\theta_{initial}$. The effective distance between the servo signal reading elements L cos $\theta_c$ is a value smaller than L cos $\theta_{initial}$ at the start of running of the magnetic tape. In a case where the width of the magnetic tape contracts during running of the magnetic tape, it is preferable to perform such angle adjustment.

On the other hand, in FIG. 3, the left figure shows a state of the module in a case where the angle $\theta$ is set to an angle $\theta_c$ which is an angle smaller than $\theta_{initial}$. The effective distance between the servo signal reading elements L cos $\theta_c$ is a value larger than L cos $\theta_{initial}$ at the start of running of the magnetic tape. In a case where the width of the magnetic tape expands during running of the magnetic tape, it is preferable to perform such angle adjustment.

Figure 4:
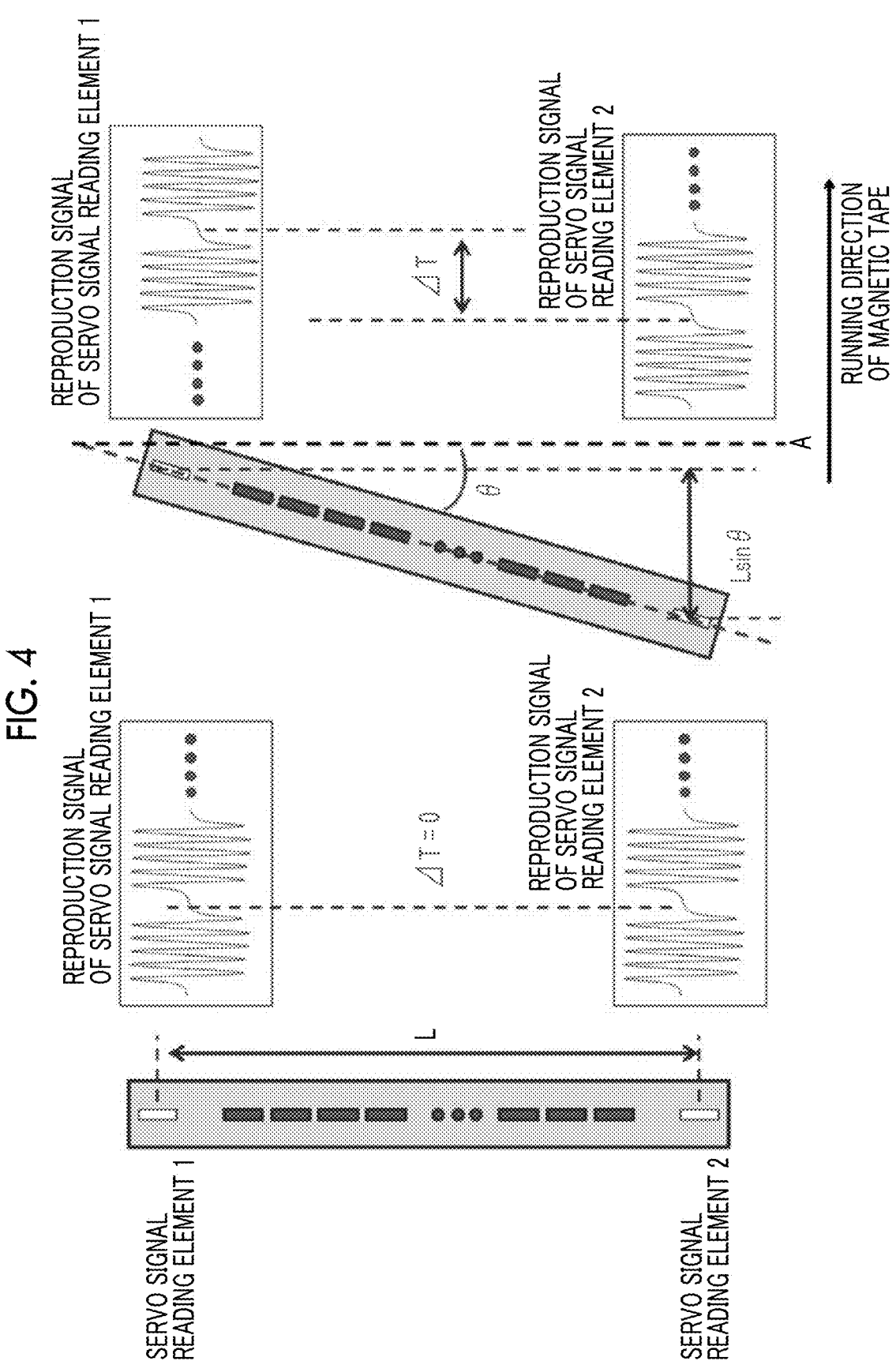
FIG. 4 is an explanatory diagram of a measuring method of an angle θ during magnetic tape running.

FIG. 4 is an explanatory diagram of a measuring method of an angle $\theta$ during magnetic tape running. In the embodiment of the present invention and the present specification, the angle $\theta$ during the running of the magnetic tape is obtained by the following method.

A phase difference (that is, a time difference) $\Delta T$ between the reproduction signals of the pair of servo signal reading elements 1 and 2 is measured. The measurement of $\Delta T$ can be performed by a measurement unit provided in the magnetic tape apparatus. A configuration of such a measurement unit is well-known. The distance L between the central portion of the servo signal reading element 1 and the central portion of the servo signal reading element 2 can be measured by an optical microscope or the like. In a case where the running speed of the magnetic tape is a speed v, the distance between the central portions of the two servo signal reading elements in the running direction of the magnetic tape is L sin $\theta$, and a relationship of L sin $\theta = v \times \Delta T$ is established. Therefore, the angle $\theta$ during running of the magnetic tape can be calculated by the equation "$\theta = \arcsin(v\Delta T/L)$". The right figure of FIG. 4 shows an example in which the axis of the element array is tilted in the running direction of the magnetic tape. In this example, the phase difference (that is, the time difference) $\Delta T$ of the phase of the reproduction signal of the servo signal reading element 2 with respect to the phase of the reproduction signal of the servo signal reading element 1 is measured. In a case where the axis of the element array is tilted in the direction opposite to the running direction of the magnetic tape, $\theta$ is set to be obtained by the above-described method except for a point where $\Delta T$ is measured as the phase difference (that is, the time difference) of the phase of the reproduction signal of the servo signal reading element 1 with respect to the phase of the reproduction signal of the servo signal reading element 2.

A pitch suitable for a measurement pitch of the angle $\theta$, that is, a measurement interval of the angle $\theta$ in the tape longitudinal direction can be selected according to a frequency of the tape width deformation in the tape longitudinal direction. As an example, the measurement pitch can be set to, for example, 250 μm, and the measurement pitch is set to 250 μm for Examples and Comparative Examples described later.

(TC)

"TC" in Expression 1 is a value (unit: μm) calculated by "$TC = L\{\cos(\theta_{initial} - \Delta\theta) - \cos(\theta_{initial} + \Delta\theta)\}$". As described above, the present inventors consider that TC may be an indicator of the track position deviation amount allowed in a case of performing the recording and/or reproducing of data by changing the head tilt angle (angle $\theta$) during the running of the magnetic tape.

The L in the above equation is as described above.

The $\theta_{initial}$ is the angle $\theta$ at the start of running, and is as described above.

In a case where a maximum value of the angle $\theta$ during the running of the magnetic tape is defined as $\theta_{max}$ and a minimum value thereof is defined as $\theta_{min}$, $\Delta\theta$ is a larger value between $\Delta\theta_{max}$ and $\Delta\theta_{min}$ calculated by the following expressions.

$$\Delta\theta_{max} = \theta_{max} - \theta_{initial}$$

$$\Delta\theta_{min} = \theta_{initial} - \theta_{min}$$

The $\Delta\theta$ can be described as a maximum change amount of the angle $\theta$ during the running of the magnetic tape. Note that "max" is an abbreviation for maximum, and "min" is an abbreviation for minimum. The $\theta_{max}$ and $\theta_{min}$ are the maximum value and the minimum value of the angle $\theta$ during the running of the magnetic tape, which are obtained by the method described above. In one aspect, $\theta_{initial}$ may also be $\theta_{max}$ or $\theta_{initial}$ may also be $\theta_{min}$. That is, the angle $\theta$ during the running may also decrease only, or may also increase only, with respect to the start of running. $\Delta\theta$ may be more than 0.000°, and, from the viewpoint of the adjustment ability to adjust the effective distance between the servo signal reading elements in response to the dimension change in the width direction of the magnetic tape, $\Delta\theta$ is preferably 0.001° or more and more preferably 0.010° or more. From the viewpoint of easiness of ensuring synchronization of the recorded data and/or the reproduced data between a plurality of magnetic head elements during the recording and/or reproduction of the data, $\Delta\theta$ is preferably 1.000° or less, more preferably 0.900° or less, still more preferably 0.800° or less, still more preferably 0.700° or less, and still more preferably 0.600° or less.

Regarding TC, the magnetic tape apparatus may satisfy Expression 1, and the value of TC is not particularly limited. In one aspect, for example, TC can be more than 0 μm, 0.1 μm or more, 0.3 μm or more, or 0.5 μm or more, and for example, can be 3.0 μm or less, 2.5 μm or less, 2.0 μm or less, or 1.5 μm or less.

<Specific Example of Magnetic Tape Apparatus>

Figure 5:
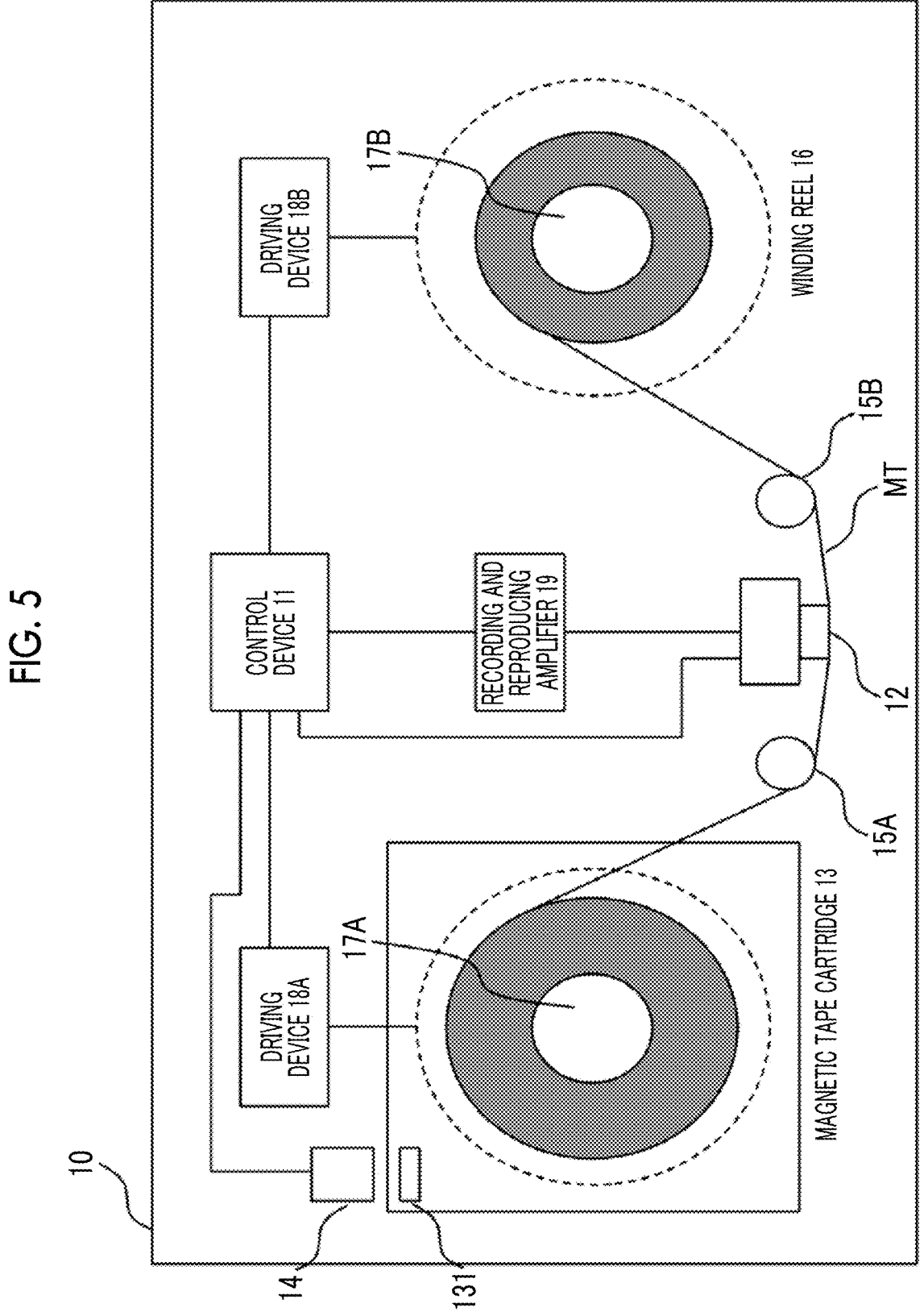
FIG. 5 is a schematic diagram showing an example of the magnetic tape apparatus.

FIG. 5 shows a specific example of the magnetic tape apparatus.

A magnetic tape apparatus 10 shown in FIG. 5 controls a recording and reproducing head unit 12 in accordance with an instruction from a control device 11, and records and reproduces data on a magnetic tape MT.

The magnetic tape apparatus 10 has a configuration capable of detecting and adjusting the tension applied in the longitudinal direction of the magnetic tape from spindle motors 17A and 17B for controlling rotation of a magnetic tape cartridge reel and a winding reel and driving devices 18A and 18B thereof.

The magnetic tape apparatus 10 has a configuration capable of loading a magnetic tape cartridge 13.

The magnetic tape apparatus 10 has a cartridge memory reading and writing device 14 capable of reading and writing a cartridge memory 131 in the magnetic tape cartridge 13.

From the magnetic tape cartridge 13 mounted on the magnetic tape apparatus 10, an end part or a leader pin of the magnetic tape MT is pulled out by an automatic loading mechanism or a manual operation, and the magnetic layer surface of the magnetic tape MT passes on the recording and reproducing head through guide rollers 15A and 15B in a direction contacting with a recording and reproducing head surface of the recording and reproducing head unit 12, and thus the magnetic tape MT is wound around a winding reel 16.

The rotation and torque of the spindle motor 17A and the spindle motor 17B are controlled by a signal from the control device 11, and the magnetic tape MT is run at any speed and tension. A servo pattern formed in advance on the magnetic tape can be used for a control of the tape speed and a control of the angle θ. In order to detect the tension, a tension detecting mechanism may be provided between the magnetic tape cartridge 13 and the winding reel 16. The tension may be adjusted by using the guide rollers 15A and 15B in addition to the control by the spindle motors 17A and 17B.

The cartridge memory reading and writing device 14 is configured to be capable of reading out and writing information in the cartridge memory 131 in response to an instruction from the control device 11. As a communication method between the cartridge memory reading and writing device 14 and the cartridge memory 131, for example, an international organization for standardization (ISO) 14443 method can be employed.

The control device 11 includes, for example, a controller, a storage unit, a communication unit, and the like.

The recording and reproducing head unit 12 includes, for example, a recording and reproducing head, a servo tracking actuator that adjusts a position of the recording and reproducing head in the track width direction, a recording and reproducing amplifier 19, a connector cable for connection with the control device 11, and the like. The recording and reproducing head is as described above for the magnetic head.

The recording and reproducing head unit 12 is configured to be capable of recording data on the magnetic tape MT in response to an instruction from the control device 11. In addition, the recording and reproducing head unit 12 is configured to be capable of reproducing the data recorded on the magnetic tape MT is configured to be able to be reproduced in response to an instruction from the control device 11.

The control device 11 has a mechanism for obtaining the running position of the magnetic tape from the servo signal read from the servo band during running of the magnetic tape MT, and controlling the servo tracking actuator such that the recording element and/or the reproducing element is located at a target running position (track position). The track position is controlled by feedback control, for example. The control device 11 has a mechanism for obtaining a servo band interval from servo signals read from two adjacent servo bands during running of the magnetic tape MT. The control device 11 can store the obtained information on the servo band interval in the storage unit inside the control device 11, the cartridge memory 131, an external connection device, or the like. In addition, the control device 11 changes the angle θ in accordance with the dimensional information of the magnetic tape in the width direction during the running. Accordingly, the effective distance between the servo signal reading elements can be made to approximate to or match with the interval between the servo bands. The dimensional information can be acquired by using a servo pattern formed in advance on the magnetic tape. The angle θ can be adjusted by, for example, feedback control. For example, the angle θ can be adjusted by a method described in Examples which will be described later.

Alternatively, the angle θ can be adjusted by the method described in JP2016-524774A or US2019/0164573A1.

For example, as described above, the control device 11 or similar methods is used, and the angle θ can be variably adjusted in the magnetic tape apparatus, during the running of the magnetic tape, for example, during the recording of data onto the magnetic tape and/or the reproducing of data recorded on the magnetic tape.

In a case of recording data and/or reproducing recorded data, first, tracking using the servo signal can be performed. That is, by causing the servo signal reading element to follow a predetermined servo track, the magnetic head element can be controlled to pass on the target data track. Displacement of the data track is performed by changing a servo track read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

Figure 6:
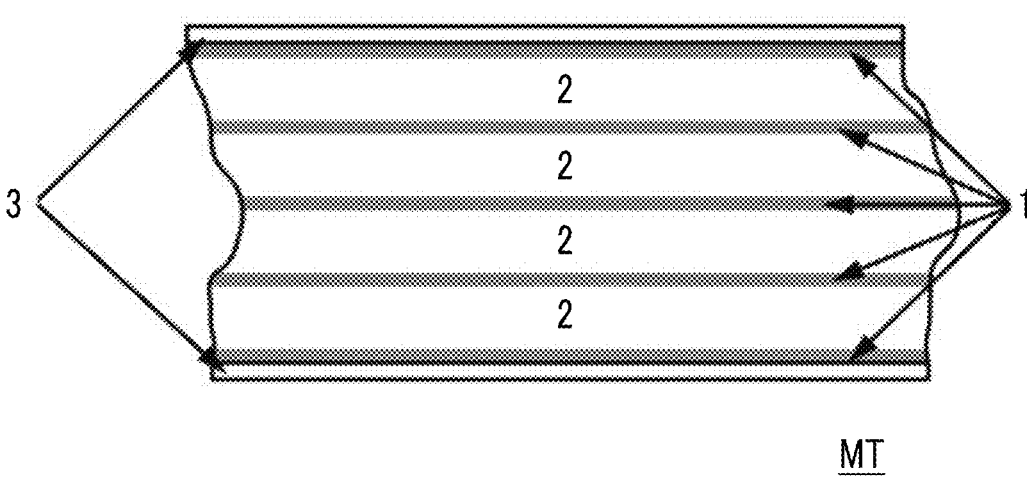
FIG. 6 shows an arrangement example of data bands and servo bands.
Figure 7:
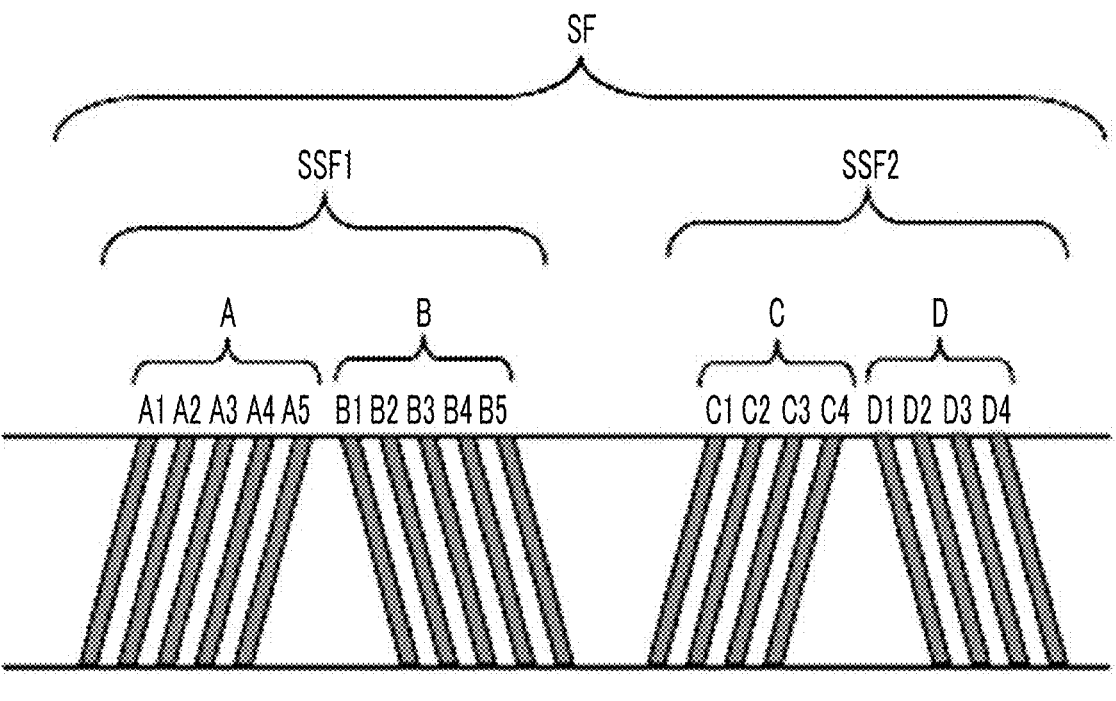
FIG. 7 shows an arrangement example of a servo pattern of a linear tape-open (LTO) Ultrium format tape.

FIG. 6 shows an arrangement example of data bands and servo bands. In FIG. 6, a plurality of servo bands 1 are arranged to be interposed between guide bands 3 in a magnetic layer of a magnetic tape MT. A plurality of regions 2 interposed between two servo bands are data bands. The servo pattern is a magnetization region, and is formed by magnetizing a specific region of the magnetic layer by the servo write head. A region magnetized by the servo write head (a position where the servo pattern is formed) is determined by the standard. For example, in an LTO Ultrium format tape which is based on a local standard, a plurality of servo patterns inclined with respect to a tape width direction as shown in FIG. 7 are formed on a servo band, in a case of manufacturing a magnetic tape. Specifically, in FIG. 7, a servo frame SF on the servo band 1 is composed of a servo sub-frame 1 (SSF1) and a servo sub-frame 2 (SSF2). The servo sub-frame 1 is composed of an A burst (in FIG. 7, reference numeral A) and a B burst (in FIG. 7, reference numeral B). The A burst is composed of servo patterns A1 to A5 and the B burst is composed of servo patterns B1 to B5. Meanwhile, the servo sub-frame 2 is composed of a C burst (in FIG. 7, reference numeral C) and a D burst (in FIG. 7, reference numeral D). The C burst is composed of servo patterns C1 to C4 and the D burst is composed of servo patterns D1 to D4. Such 18 servo patterns are arranged in the sub-frames in an array of 5, 5, 4, 4, as the sets of 5 servo patterns and 4 servo patterns, and are used for identifying the servo frames. FIG. 7 shows one servo frame for description. Note that, in practice, a plurality of the servo frames are arranged in the running direction in each servo band in the magnetic layer of the magnetic tape on which the head tracking of the timing-based servo system is performed. In FIG. 7, the arrow indicates the running direction of the magnetic tape. For example, an LTO Ultrium format tape usually has 5000 or more servo frames per 1 m of tape length in each servo band of the magnetic layer.

EXAMPLES

Hereinafter, an aspect of the present invention will be described based on Examples. Note that the present invention is not limited to the embodiments shown in Examples. Unless otherwise specified, "parts" and "%" in the following description indicate "parts by mass" and "mass %". "eq" indicates equivalent and is a unit not convertible into SI unit.

In addition, various steps and operations described below were performed in an environment of a temperature of 20° C. to 25° C. and a relative humidity of 40% to 60%, unless otherwise noted.

In Table 1, "PEN" indicates a polyethylene naphthalate support. The moisture content and Young's modulus in Table 1 are values measured by the method described above.

Example 1

(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 manufactured by Toyobo Co., Ltd. (amount of a polar group: 80 meq/kg)), and 570.0 parts of a mixed solution of methyl ethyl ketone and cyclohexanone at 1:1 (mass ratio) as a solvent were mixed with respect to 100.0 parts of an alumina powder (HIT-80 manufactured by Sumitomo Chemical Co., Ltd.) having a pregelatinization ratio of about 65% and a Brunauer-Emmett-Teller (BET) specific surface area of 20 $m^2/g$, and dispersed in the presence of zirconia beads by a paint shaker for 5 hours. After the dispersion, the dispersion liquid and the beads were separated by a mesh and an alumina dispersion was obtained.

(2) Formulation of Magnetic Layer Forming Composition

| (Magnetic Liquid) | |
|---|---|
| Ferromagnetic powder | 100.0 parts |
| Hexagonal barium ferrite powder having a verage particle size (average plate diameter) of 21 nm ("BaFe" in Table 1) | |
| SO₃Na group-containing polyurethane resin | 14.0 parts |
| Weight-average molecular weight: 70,000, SO₃Na group: 0.2 meq/g | |
| Cyclohexanone | 150.0 parts |
| Methyl ethyl ketone | 150.0 parts |
| (Abrasive Solution) | |
| Alumina dispersion prepared in the section (1) | 6.0 parts |
| (Silica Sol (Protrusion Forming Agent Liquid)) | |
| Colloidal silica (average particle size: 120 nm) | 2.0 parts |
| Methyl ethyl ketone | 1.4 parts |
| (Other Components) | |
| Stearic acid | 2.0 parts |
| Stearic acid amide | 0.2 parts |
| Butyl stearate | 2.0 parts |
| Polyisocyanate (CORONATE (registered trademark) L manufactured by Tosoh Corporation) | 2.5 parts |
| (Finishing Additive Solvent) | |
| Cyclohexanone | 200.0 parts |
| Methyl ethyl ketone | 200.0 parts |

(3) Formulation of Non-Magnetic Layer Forming Composition

| Non-magnetic inorganic powder: α-iron oxide | 100.0 parts |
|---|---|
| Average particle size (average long axis length): 0.15 μm | |
| Average acicular ratio: 7 | |
| BET specific surface area: 52 m²/g | |
| Carbon black | 20.0 parts |
| Average particle size: 20 nm | |
| SO₃Na group-containing polyurethane resin | 18. 0 parts |
| Weight-average molecular weight: 70,000, SO₃Na group: 0.2 meq/g | |
| Stearic acid | 2.0 parts |
| Stearic acid amide | 0.2 parts |
| Butyl stearate | 2.0 parts |

-continued

| Cyclohexanone | 300.0 parts |
|---|---|
| Methyl ethyl ketone | 300.0 parts |

(4) Formulation of Back Coating Layer Forming Composition

| Carbon black | 100.0 parts |
|---|---|
| Dibutyl phthalate (DBP) oil absorption amount: 74 cm³/100 g | |
| Nitrocellulose | 27.0 parts |
| Polyester polyurethane resin containing sulfonic acid group and/or salt thereof | 62.0 parts |
| Polyester resin | 4.0 parts |
| Alumina powder (BET specific surface area: 17 m²/g) | 0.6 parts |
| Methyl ethyl ketone | 600.0 parts |
| Toluene | 600.0 parts |
| Polyisocyanate (CORONATE (registered trademark) L manufactured by Tosoh Corporation) | 15.0 parts |

(5) Preparation of Composition for Forming Each Layer

The composition for forming a magnetic layer was prepared by the following method. The above magnetic liquid was prepared by dispersing the above components for 24 hours (beads-dispersion) using a batch type vertical sand mill. As dispersion beads, zirconia beads having a bead diameter of 0.5 mm were used. Using the sand mill, the prepared magnetic liquid, the abrasive liquid, and other components (silica sol, other components, and finishing additive solvent) were mixed and bead-dispersed for 5 minutes, and then subjected to a treatment (ultrasonic dispersion) for 0.5 minutes by a batch type ultrasonic device (20 kHz, 300 W). Thereafter, filtration was performed using a filter having a pore diameter of 0.5 μm to prepare a magnetic layer forming composition.

A composition for forming a non-magnetic layer was prepared by the following method. The components described above excluding the lubricant (stearic acid, stearic acid amide, and butyl stearate) were kneaded and diluted by an open kneader, and subjected to a dispersion treatment by a horizontal beads mill disperser. After that, the lubricant (stearic acid, stearic acid amide, and butyl stearate) was added into the obtained dispersion liquid and stirred and mixed by a dissolver stirrer to prepare a non-magnetic layer forming composition.

A composition for forming a back coating layer was prepared by the following method. The above components excluding polyisocyanate were introduced into a dissolver stirrer, stirred at a circumferential speed of 10 m/sec for 30 minutes, and then subjected to a dispersion treatment by a horizontal beads mill disperser. After that, polyisocyanate was added, and stirred and mixed by a dissolver stirrer, and a composition for forming a back coating layer was prepared.

(6) Method of Manufacturing of Magnetic Tape and Magnetic Tape Cartridge

The non-magnetic layer forming composition prepared in the section (5) was applied onto the surface of the biaxially stretched support shown in Table 1 such that the thickness after the drying was set to 1.0 μm, and was dried to form a non-magnetic layer. Next, the magnetic layer forming composition prepared in the section (5) was applied onto the non-magnetic layer so that the thickness after drying was 0.1 μm to form a coating layer. After that, a homeotropic alignment process was performed by applying a magnetic field having a magnetic field strength of 0.3 T in a vertical direction with respect to a surface of a coating layer, while the coating layer of the magnetic layer forming composition is not dried. Then, the drying was performed to form the magnetic layer. After that, the back coating layer forming composition prepared in the section (5) was applied onto a surface of the support opposite to the surface on which the non-magnetic layer and the magnetic layer are formed and was dried so that the thickness after drying was 0.5 μm, and thus, a back coating layer was formed.

After that, a surface smoothing treatment (calendering treatment) was performed using a calender roll formed of only metal rolls at a speed of 100 m/min, a linear pressure of 300 kg/cm, and a calender temperature of 90° C. (surface temperature of calender roll).

After that, a long magnetic tape original roll was stored in a heat treatment furnace having an atmosphere temperature of 70° C. to perform a heat treatment (heat treatment time: 36 hours). After the heat treatment, the resultant was slit to have ½ inches width to obtain a magnetic tape. A servo signal was recorded on the magnetic layer of the obtained magnetic tape by a commercially available servo writer, to obtain a magnetic tape having a data band, a servo band, and a guide band in an arrangement according to a linear tape-open (LTO) Ultrium format and having a servo pattern (timing-based servo pattern) in an arrangement and a shape according to the LTO Ultrium format on the servo band. The servo pattern thus formed is a servo pattern according to the description in Japanese industrial standards (JIS) X6175: 2006 and Standard ECMA-319 (June 2001). The total number of servo bands is 5, and the total number of data bands is 4.

The magnetic tape (length of 970 m) after forming the servo pattern was wound around the winding core for heat treatment, and the heat treatment was performed while being wound around the winding core. As the winding core for heat treatment, a solid core member (outer diameter: 50 mm) formed of a resin and having the bending elastic modulus of 0.8 GPa was used, and the tension during winding was set as 0.6 N. The heat treatment was performed at the heat treatment temperature shown in Table 1 for 5 hours. The weight-basis absolute humidity in the atmosphere in which the heat treatment was performed was 10 g/kg Dry air.

After the heat treatment, the magnetic tape and the core for heat treatment were sufficiently cooled, the magnetic tape was detached from the core for heat treatment and wound around the core for temporary winding, and then, the magnetic tape having the final product length (960 m) was wound around the reel (reel outer diameter: 44 mm) of the magnetic tape cartridge (LTO Ultrium 7 data cartridge) from the core for temporary winding. The remaining length of 10 m was cut out and the leader tape based on section 9 of Standard European Computer Manufacturers Association (ECMA)-319 (June 2001) Section 3 was bonded to the end of the cut side by using a commercially available splicing tape. As the temporary winding core, a solid core member made of the same material and having the same outer diameter as the winding core for heat treatment was used, and the tension during winding was set as 0.6 N.

Therefore, the magnetic tape cartridge of the single reel type in which the magnetic tape having a length of 960 m was wound on the reel was manufactured.

Two magnetic tape cartridges were manufactured by the above method, one was used for the following (1) to (3), and the other was used for (4) and (5) described later.

[Evaluation Method]

(1) TDSage

The magnetic tape cartridge accommodating the magnetic tape to be measured was placed in an environment of an atmosphere temperature of 23° C. and a relative humidity of 50% for 5 days in order to make the magnetic tape cartridge fit into the measurement environment.

After that, in the measurement environment, in the magnetic tape apparatus shown in FIG. 5, the magnetic tape was allowed to run in a state where a tension of 0.7 N was applied in the longitudinal direction of the magnetic tape. For such running, an interval between two servo bands adjacent to each other with a data band interposed therebetween was measured over the entire length of the magnetic tape at intervals of 1 m. The measurement was performed for the entire servo band interval. The servo band interval measured in this way was defined as "servo band interval before storage" at each measurement position. The interval between two servo bands adjacent to each other across the data band is obtained as follows.

To obtain the interval of two adjacent servo bands with the data band interposed therebetween, the dimension of the servo pattern is needed. The standards of the dimensions of the servo pattern depend on the generation of LTO. First, an average distance AC between four stripes corresponding to an A burst and a C burst and an azimuth angle α of the servo pattern were measured by using a magnetic force microscope or the like.

Next, the servo patterns formed on the magnetic tape are sequentially read along the tape longitudinal direction by using a reel tester and a servo head comprising two servo signal reading elements (hereinafter, one side is referred to as an upper side and the other side is referred to as a lower side.) fixed at intervals in the direction orthogonal to the longitudinal direction of the magnetic tape. An average time between five stripes corresponding to the A burst and the B burst over a length of one LPOS word is defined as a. An average time of the corresponding four stripes of the A burst and the C burst over a length of 1 m is defined as b. In this case, a value defined by $AC \times (\frac{1}{2} - a/b)/(2 \times \tan(a))$ represents a reading position PES in the width direction based on the servo signal obtained by the servo signal reading element. Reading of the servo pattern is simultaneously performed by the upper and lower two servo signal reading elements. A value of the PES obtained by the upper servo signal reading element is referred to as PES1, and a value of the PES obtained by the lower servo signal reading element is referred to as PES2. As "PES2−PES1", the interval between two adjacent servo bands with a data band interposed therebetween can be obtained. This is because the upper and lower servo pattern reading elements are fixed to the servo head and their intervals do not change.

Then, the magnetic tape cartridge was stored in an environment of an atmosphere temperature of 60° C. and a relative humidity of 20% for 36 hours.

After the storage, after the magnetic tape cartridge was placed in a measurement environment of an atmosphere temperature of 23° C. and a relative humidity of 50% for 5 days, in the same measurement environment, in the magnetic tape apparatus shown in FIG. 5, the magnetic tape was allowed to run in a state where a tension of 0.7 N was applied in the longitudinal direction of the magnetic tape. For such running, the servo band interval was measured by the method described above. The servo band interval measured in this way was defined as the "servo band interval after storage" at each measurement position.

For the entire servo band interval, a difference between the servo band interval before the storage and the servo band interval after the storage measured at intervals of 1 m was obtained. In this way, a plurality of values of the difference are obtained. The maximum value of the absolute value of the obtained difference was defined as "TDSage" of the magnetic tape to be measured.

(2) TDSenv

In the 5 environments (temperature 16° C. and relative humidity 20%, temperature 16° C. and relative humidity 80%, temperature 26° C. and relative humidity 80%, temperature 32° C. and relative humidity 20%, and temperature 32° C. and relative humidity 55%), the measurement was performed by the following methods, respectively.

For each measurement environment, the magnetic tape cartridge accommodating the magnetic tape to be measured was placed in the measurement environment for 5 days in order to make the magnetic tape cartridge fit into the measurement environment.

After that, in the measurement environment, in the magnetic tape apparatus shown in FIG. 5, the magnetic tape was allowed to run in a state where a tension of 0.7 N was applied in the longitudinal direction of the magnetic tape. In the data band 0 (zero) at the reel outer peripheral portion 100 m region, the servo band interval was measured by the method described in the above (1) at intervals of 1 m for the running. As described above, the arithmetic average of the measured servo band intervals was set as the servo band interval in the measurement environment.

After obtaining the servo band interval in each of the five environments as described above, a value calculated as "(maximum value−minimum value)×½" by using the maximum value and the minimum value among the obtained values was defined as "TDSenv" of the magnetic tape to be measured.

(3) Tape Thickness

The magnetic tape cartridge after the above-described evaluation is placed in an environment having a temperature of 20° C. to 25° C. and a relative humidity of 40% to 60% for 5 days or more to allow the magnetic tape cartridge to adapt to the environment. Then, subsequently, in the same environment, 10 tape samples (length 5 cm) are cut out from a random part of the magnetic tape taken out from the magnetic tape cartridge, and these tape samples are stacked to measure the thickness. The thickness was measured using a digital thickness gauge of Millimar 1240 compact amplifier and Millimar 1301 induction probe manufactured by MARH Inc. A value (thickness per tape sample) obtained by dividing the measured thickness by 1/10 was defined as the tape thickness. With respect to each magnetic tape, the tape thickness is the thickness shown in Table 1.

(4) Recording and Reproducing Performance

The evaluation of the recording and reproducing performance was performed using the magnetic tape apparatus having the configuration shown in FIG. 5. The arrangement order of the modules included in the recording and reproducing head mounted on the recording and reproducing head unit is "recording module-reproducing module-recording module" (total number of modules: 3). The number of magnetic head elements in each module is 32 (Ch0 to Ch31), and the element array is configured by sandwiching these magnetic head elements between the pair of servo signal reading elements. The reproducing element width of the reproducing element included in the reproducing module is 0.8 μm.

The magnetic tape cartridge was placed in the environment, in which the servo band interval obtained in the measurement for obtaining TDSenv was the maximum value for 5 days or longer in the five environments. After the data was fit into the environment in this way, the data was continuously recorded in the same environment as follows.

The magnetic tape cartridge was set in the magnetic tape apparatus and the magnetic tape was loaded. Next, pseudo random data having a specific data pattern was recorded on the magnetic tape by the recording and reproducing head unit while performing servo tracking. In this case, the tension applied in the tape longitudinal direction is set to 0.7 N. Regarding the recording and reproducing head (magnetic head), at the start of recording and the start of reproducing, the axis of the element array is inclined in the magnetic tape running direction, and the angle $\theta$ is set to an angle shown in the column of "$\theta_{initial}$" in Table 1. In the data recording, three or more round trips are recorded such that a difference between the values of (PES1+PES2)/2 between adjacent tracks is 1.16 μm. At that time, the angle $\theta$ is changed by the control device of the magnetic tape apparatus, such that a difference between "PES2−PES1" corresponding to the effective distance between the servo signal reading elements of one servo signal reading element and the other servo signal reading element of the element array of the reproducing module of the recording and reproducing head and the interval between the two servo bands adjacent to each other with the data band interposed therebetween is reduced. Simultaneously with the recording of the data, the value of the servo band interval of the tape total length was measured at every 1 m of the longitudinal position and recorded in the cartridge memory.

The magnetic tape cartridge in which the data was recorded as described above was placed in a storage environment of an atmosphere temperature of 60° C. and a relative humidity of 20% for 36 hours.

After that, the magnetic tape cartridge was placed in the five environments, in which the servo band interval obtained in the measurement for obtaining TDSenv was the minimum value, for 5 days or longer. After the data was fit into the environment in this way, the data was continuously reproduced in the same environment as follows.

The magnetic tape cartridge was set in the magnetic tape apparatus and the magnetic tape was loaded. Then, the data recorded on the magnetic tape are reproduced by the recording and reproducing head unit while performing servo tracking. In that case, the value of the servo band interval is measured at the same time as the reproduction, and the angle $\theta$ is changed by the control device of the magnetic tape apparatus such that the absolute value of the difference from the servo band interval during the recording at the same longitudinal position approaches zero, based on the information recorded in the cartridge memory. During the reproduction, the measurement of the servo band interval and the adjustment of the angle $\theta$ based on the measurement are continuously performed in real time.

The number of reproducing elements (number of channels) in the reproducing described above is 32 channels. In a case where all the data of 32 channels were correctly read during the reproducing, the recording and reproducing performance is evaluated as "3", in a case where data of 31 to 28 channels were correctly read, the recording and reproducing performance is evaluated as "2", and in other cases, the recording and reproducing performance is evaluated as "1".

(5) TC

Regarding the reproduction of the above (4), the angle $\theta$ was obtained for the reproduction module by the method described above. The $\Delta\theta$ was calculated from the obtained value, and TC was calculated by "TC=L{cos ($\theta_{initial}$−$\Delta\theta$)− cos $(\theta_{initial}+\Delta\theta)\}$". In the reproducing module included in the recording and reproducing head, L was 2859 μm.

From the various values obtained as described above, the left side of Expression 1 (that is, "TDSage+TDSenv−TC") was calculated.

Examples 2 to 23 and Comparative Examples 1 to 12

A magnetic tape cartridge was manufactured by the method described in Example 1, except for a point in that the items in Table 1 were changed as shown in Table 1, and various evaluations were performed.

In the examples and the comparative examples in which "-" is described in the column of "Heat treatment temperature" in Table 1, the magnetic tape having a final product length of 960 m was accommodated in the magnetic tape cartridge without performing the heat treatment in a state of being wound around the core for heat treatment.

In Table 1, in the comparative examples described as "none" in the columns of "$\theta_{initial}$" and "$\Delta\theta$", the angle $\theta$ was set to 0° at the start of the running of the magnetic tape and during the running.

Example 24

A magnetic tape cartridge was manufactured by the method described in Example 1, except for a point in that, as the ferromagnetic powder, a hexagonal strontium ferrite powder (in Table 1, "SrFe1") manufactured as described below was used, and various evaluations were performed.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a pair of water-cooling rollers to manufacture an amorphous body.

280 g of the manufactured amorphous body was charged into an electric furnace, was heated to 635° C. (crystallization temperature) at a temperature rising rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an internal temperature of the furnace of 110° C. for 6 hours to obtain a hexagonal strontium ferrite powder.

An average particle size of the hexagonal strontium ferrite powder obtained above was 18 nm, an activation volume was 902 $nm^3$, an anisotropy constant Ku was $2\times10^5$ $J/m^3$, and a mass magnetization σs was 49 $A\cdot m^2/kg$.

12 mg of a sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of a sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector

Soller slit of incident beam and diffracted beam: 0.017 radians

Fixed angle of dispersion slit: ¼ degrees

Mask: 10 mm

Anti-scattering slit: ¼ degrees

Measurement mode: continuous

Measurement time per stage: 3 seconds

Measurement speed: 0.017 degrees per second

Measurement step: 0.05 degrees

Example 25

A magnetic tape cartridge was manufactured by the method described in Example 1, except for a point in that, as the ferromagnetic powder, a hexagonal strontium ferrite powder (in Table 1, "SrFe2") manufactured as described below was used, and various evaluations were performed.

1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed by a mixer to obtain a raw material mixture.

The obtained raw material mixture was melted in a platinum crucible at a melting temperature of 1380° C., and a hot water outlet provided at a bottom of the platinum crucible was heated while stirring a melt, and the melt was discharged in a rod shape at about 6 g/sec. Hot water was rolled and quenched by a pair of water-cooling rolls to manufacture an amorphous body.

280 g of the obtained amorphous body was charged into an electric furnace, was heated to 645° C. (crystallization temperature), and was held at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an internal temperature of the furnace of 110° C. for 6 hours to obtain a hexagonal strontium ferrite powder.

An average particle size of the obtained hexagonal strontium ferrite powder was 19 nm, an activation volume was 1102 nm$^3$, an anisotropy constant Ku was $2.0 \times 10^5$ J/m$^3$, and a mass magnetization σs was 50 A·m$^2$/kg.

Example 26

A magnetic tape cartridge was manufactured by the method described in Example 1, except for a point in that, as the ferromagnetic powder, an ε-iron oxide powder (in Table 1, "ε-iron oxide") manufactured as described below was used, and various evaluations were performed.

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid aqueous solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at an in-furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was added dropwise and was stirred for 24 hours. A powder sedimented by adding 50 g of ammonium sulfate to the obtained reaction solution was collected by centrifugal separation, was washed with pure water, and was dried in a heating furnace at a furnace temperature of 80° C. for 24 hours to obtain ferromagnetic powder precursor.

The obtained ferromagnetic powder precursor was loaded into a heating furnace at an in-furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain ferromagnetic powder.

The composition of the obtained ferromagnetic powder that was checked by high-frequency inductively coupled plasma-optical emission spectrometry (ICP-OES) has Ga, Co, and a Ti substitution type ε-iron oxide ($\varepsilon$-Ga$_{0.28}$Co$_{0.05}$Ti$_{0.05}$Fe$_{1.62}$O$_3$). In addition, X-ray diffraction analysis is performed under the same condition as that described above for the hexagonal strontium ferrite powder SrFe1, and from a peak of an X-ray diffraction pattern, it is checked that the obtained ferromagnetic powder does not include α-phase and α-phase crystal structures, and has a single-phase and ε-phase crystal structure (ε-iron oxide crystal structure).

The obtained ε-iron oxide powder had an average particle size of 12 nm, an activation volume of 746 nm$^3$, an anisotropy constant Ku of $1.2 \times 10^5$ J/m$^3$, and a mass magnetization σs of 16 A·m$^2$/kg.

An activation volume and an anisotropy constant Ku of the above hexagonal strontium ferrite powder and ε-iron oxide powder are values obtained by the method described above using a vibrating sample magnetometer (manufactured by Toei Industry Co., Ltd.) for each ferromagnetic powder.

In addition, a mass magnetization σs is a value measured at a magnetic field intensity of 1194 kA/m (15 kOe) using a vibrating sample magnetometer (manufactured by Toei Industry Co., Ltd.).

The above results are shown in Table 1 (Tables 1-1 to 1-2).

TABLE 1-1

| | | | | | | | Young's modulus of support in width direction |
|---|---|---|---|---|---|---|---|
| | | | | | | Moisture | |
| | Ferromagnetic powder | Heat treatment temperature | TDSage | Type of support | Thickness of support | content of support | |
| | | | Unit | | | | |
| | | ° C. | μm | | μm | % | MPa |
| Example1 | BaFe | 60 | 0.70 | PEN | 4.0 | 1.0% | 10000 |
| Example2 | BaFe | 60 | 0.70 | PEN | 4.0 | 1.0% | 10000 |
| Example3 | BaFe | 60 | 0.70 | PEN | 4.0 | 1.0% | 10000 |
| Example4 | BaFe | 60 | 0.70 | PEN | 4.0 | 1.0% | 10000 |
| Example5 | BaFe | 60 | 0.70 | PEN | 4.0 | 1.0% | 10000 |
| Example6 | BaFe | 60 | 0.70 | PEN | 4.0 | 1.0% | 10000 |
| Example7 | BaFe | 60 | 0.70 | PEN | 4.0 | 1.0% | 10000 |

TABLE 1-1-continued

| | | | | | | | |
|---|---|---|---|---|---|---|---|
| Example8 | BaFe | 60 | 0.70 | PEN | 4.0 | 1.0% | 10000 |
| Example9 | BaFe | 60 | 0.70 | PEN | 4.0 | 1.0% | 10000 |
| Example10 | BaFe | 60 | 0.70 | PEN | 4.0 | 1.0% | 10000 |
| Example11 | BaFe | — | 1.00 | PEN | 4.0 | 0.1% | 10000 |
| Example12 | BaFe | — | 1.00 | PEN | 4.0 | 0.1% | 10000 |
| Example13 | BaFe | — | 1.00 | PEN | 3.6 | 1.0% | 10000 |
| Example14 | BaFe | — | 1.00 | PEN | 3.6 | 1.0% | 10000 |
| Example15 | BaFe | 70 | 0.60 | PEN | 4.0 | 1.0% | 10000 |
| Example16 | BaFe | 70 | 0.60 | PEN | 4.0 | 1.0% | 10000 |
| Example17 | BaFe | 60 | 0.70 | PEN | 4.0 | 1.0% | 11000 |
| Example18 | BaFe | 60 | 0.70 | PEN | 4.0 | 1.0% | 11000 |
| Example19 | BaFe | 60 | 0.70 | PEN | 4.0 | 1.0% | 11000 |
| Example20 | BaFe | 60 | 0.70 | PEN | 4.0 | 1.0% | 11000 |
| Example21 | BaFe | 60 | 0.70 | PEN | 4.0 | 1.0% | 11000 |
| Example22 | BaFe | 60 | 0.70 | PEN | 4.0 | 1.0% | 12000 |
| Example23 | BaFe | 60 | 0.70 | PEN | 4.0 | 1.0% | 12000 |
| Example24 | SrFe1 | 60 | 0.70 | PEN | 4.0 | 1.0% | 10000 |
| Example25 | SrFe2 | 60 | 0.70 | PEN | 4.0 | 1.0% | 10000 |
| Example26 | ε-iron oxide | 60 | 0.70 | PEN | 4.0 | 1.0% | 10000 |

| | Item | | | | | | |
|---|---|---|---|---|---|---|---|
| | Young's modulus of support in logitudinal direction | TDSenv | Tape thickness | $\theta_{initial}$ | Δθ | TC | TDSage + TDSenv-TC | Recording and reproducing performance |
| Unit | MPa | μm | μm | ° | ° | μm | μm | |
| Example1 | 5000 | 0.50 | 5.6 | 1.000 | 0.500 | 1.1 | 0.10 | 2 |
| Example2 | 5000 | 0.50 | 5.6 | 6.000 | 0.100 | 1.1 | 0.10 | 2 |
| Example3 | 5000 | 0.50 | 5.6 | 13.000 | 0.050 | 1.1 | 0.10 | 2 |
| Example4 | 5000 | 0.50 | 5.6 | 33.000 | 0.020 | 1.1 | 0.10 | 2 |
| Example5 | 5000 | 0.50 | 5.6 | 45.000 | 0.015 | 1.1 | 0.10 | 2 |
| Example6 | 5000 | 0.50 | 5.6 | 1.000 | 0.550 | 1.2 | 0.00 | 3 |
| Example7 | 5000 | 0.50 | 5.6 | 6.000 | 0.120 | 1.2 | 0.00 | 3 |
| Example8 | 5000 | 0.50 | 5.6 | 13.000 | 0.053 | 1.2 | 0.00 | 3 |
| Example9 | 5000 | 0.50 | 5.6 | 33.000 | 0.022 | 1.2 | 0.00 | 3 |
| Example10 | 5000 | 0.50 | 5.6 | 45.000 | 0.017 | 1.2 | 0.00 | 3 |
| Example11 | 5000 | 0.30 | 5.6 | 13.000 | 0.053 | 1.2 | 0.10 | 2 |
| Example12 | 5000 | 0.30 | 5.6 | 15.000 | 0.050 | 1.3 | 0.00 | 3 |
| Example13 | 5000 | 0.50 | 5.2 | 28.000 | 0.030 | 1.4 | 0.10 | 2 |
| Example14 | 5000 | 0.50 | 5.2 | 30.000 | 0.030 | 1.5 | 0.00 | 3 |
| Example15 | 5000 | 0.50 | 5.6 | 7.000 | 0.080 | 1.0 | 0.10 | 2 |
| Example16 | 5000 | 0.50 | 5.6 | 6.000 | 0.100 | 1.1 | 0.00 | 3 |
| Example17 | 4000 | 0.50 | 5.6 | 1.000 | 0.500 | 1.1 | 0.10 | 2 |
| Example18 | 4000 | 0.50 | 5.6 | 6.000 | 0.100 | 1.1 | 0.10 | 2 |
| Example19 | 4000 | 0.50 | 5.6 | 13.000 | 0.050 | 1.1 | 0.10 | 2 |
| Example20 | 4000 | 0.50 | 5.6 | 33.000 | 0.020 | 1.1 | 0.10 | 2 |
| Example21 | 4000 | 0.50 | 5.6 | 45.000 | 0.015 | 1.1 | 0.10 | 2 |
| Example22 | 3500 | 0.50 | 5.6 | 33.000 | 0.020 | 1.1 | 0.10 | 2 |
| Example23 | 3500 | 0.50 | 5.6 | 45.000 | 0.015 | 1.1 | 0.10 | 2 |
| Example24 | 5000 | 0.50 | 5.6 | 1.000 | 0.500 | 1.1 | 0.10 | 2 |
| Example25 | 5000 | 0.50 | 5.6 | 1.000 | 0.500 | 1.1 | 0.10 | 2 |
| Example26 | 5000 | 0.50 | 5.6 | 1.000 | 0.500 | 1.1 | 0.10 | 2 |

TABLE 1-2

| | Item | | | | | | |
|---|---|---|---|---|---|---|---|
| | Ferromagnetic powder | Heat treatment temperature | TDSage | Type of support | Thickness of support | Moisture content of support | Young's modulus of support in width direction |
| Unit | | ° C. | μm | | μm | % | MPa |
| Comparative Example1 | BaFe | — | 1.00 | PEN | 4.0 | 1.0% | 5000 |
| Comparative Example2 | BaFe | — | 1.00 | PEN | 4.0 | 1.0% | 5000 |
| Comparative Example3 | BaFe | — | 1.00 | PEN | 4.0 | 1.0% | 5000 |

TABLE 1-2-continued

| | | | | 1.00 | PEN | 4.0 | 1.0% | 5000 |
|---|---|---|---|---|---|---|---|---|
| Comparative Example4 | BaFe | — | 1.00 | PEN | 4.0 | 1.0% | 5000 | |
| Comparative Example5 | BaFe | — | 1.00 | PEN | 4.0 | 0.1% | 5000 | |
| Comparative Example6 | BaFe | — | 1.00 | PEN | 3.6 | 1.0% | 5000 | |
| Comparative Example7 | BaFe | 70 | 0.60 | PEN | 4.0 | 1.0% | 5000 | |
| Comparative Example8 | BaFe | 60 | 0.70 | PEN | 4.0 | 1.0% | 5000 | |
| Comparative Example9 | BaFe | — | 1.00 | PEN | 4.0 | 1.0% | 9000 | |
| Comparative Example10 | BaFe | — | 1.00 | PEN | 4.0 | 1.0% | 9000 | |
| Comparative Example11 | BaFe | — | 1.00 | PEN | 4.0 | 1.0% | 9000 | |
| Comparative Example12 | BaFe | — | 1.00 | PEN | 4.0 | 1.0% | 9000 | |

| | Item | | | | | | | |
|---|---|---|---|---|---|---|---|---|
| | Young's modulus of support in longitudinal direction | TDSenv | Tape thickness | $\theta_{initial}$ | $\Delta\theta$ | TC | TDSage + TDSenv-TC | Recording and reproducing performance |
| Unit | MPa | μm | μm | ° | ° | μm | μm | |
| Comparative Example1 | 6000 | 0.50 | 5.6 | None | None | 0.0 | 1.50 | 1 |
| Comparative Example2 | 6000 | 0.50 | 5.6 | 5.000 | 0.057 | 0.5 | 1.00 | 1 |
| Comparative Example3 | 6000 | 0.50 | 5.6 | 7.000 | 0.057 | 0.7 | 0.80 | 1 |
| Comparative Example4 | 6000 | 0.50 | 5.6 | 15.000 | 0.050 | 1.3 | 0.20 | 1 |
| Comparative Example5 | 6000 | 0.30 | 5.6 | 7.000 | 0.080 | 1.0 | 0.30 | 1 |
| Comparative Example6 | 6000 | 0.50 | 5.2 | 7.000 | 0.080 | 1.0 | 0.50 | 1 |
| Comparative Example7 | 6000 | 0.50 | 5.6 | 8.000 | 0.057 | 0.8 | 0.30 | 1 |
| Comparative Example8 | 6000 | 0.50 | 5.6 | 7.000 | 0.080 | 1.0 | 0.20 | 1 |
| Comparative Example9 | 6000 | 0.50 | 5.6 | None | None | 0.0 | 1.50 | 1 |
| Comparative Example10 | 6000 | 0.50 | 5.6 | 5.000 | 0.057 | 0.5 | 1.00 | 1 |
| Comparative Example11 | 6000 | 0.50 | 5.6 | 7.000 | 0.057 | 0.7 | 0.80 | 1 |
| Comparative Example12 | 6000 | 0.50 | 5.6 | 15.000 | 0.050 | 1.3 | 0.20 | 1 |

A magnetic tape cartridge was manufactured by the method previously described as in Example 1 except for a point in that the homeotropic alignment process was not performed in a case of manufacturing the magnetic tape.

A sample piece was cut out from the magnetic tape taken out from the magnetic tape cartridge. For this sample piece, a vertical squareness ratio obtained by the method described above using a TM-TRVSM5050-SMSL type manufactured by Tamakawa Co., Ltd. as a vibrating sample magnetometer was 0.55.

The magnetic tape was also taken out from the magnetic tape cartridge of Example 1, and a vertical squareness ratio was similarly determined for a sample piece cut out from the magnetic tape, which was 0.60.

The magnetic tapes taken out from the above two magnetic tape cartridges were attached to each of the ½-inch reel testers, and the electromagnetic conversion characteristics (signal-to-noise ratio (SNR)) were evaluated by the following methods. As a result, the magnetic tape taken out from the magnetic tape cartridge of Example 1 had a higher SNR value by 2 dB than the magnetic tape manufactured without the vertical alignment treatment.

In an environment of a temperature of 23° C. and a relative humidity of 50%, a tension of 0.7 N was applied in the longitudinal direction of the magnetic tape, and recording and reproduction were performed for 10 passes. A relative speed between the magnetic tape and the magnetic head was set to 6 m/sec, and recording was performed by using a metal-in-gap (MIG) head (a gap length of 0.15 μm and a track width of 1.0 μm) as a recording head and setting a recording current to an optimal recording current of each magnetic tape. Reproduction was performed by using a giant-magnetoresistive (GMR) head (an element thickness of 15 nm, a shield interval of 0.1 μm, and a reproducing element width of 0.8 μm) as a reproducing head. The head tilt angle was set to 0°. A signal having a linear recording density of 300 kfci was recorded, and measurement regarding a reproduction signal was performed with a spectrum analyzer manufactured by Shibasoku Co., Ltd. The unit kfci is a unit of a linear recording density (cannot be converted into an SI unit system). As the signal, a portion where the signal was sufficiently stable after start of the running of the magnetic tape was used.

One aspect of the present invention is useful in various data storage technical fields.

What is claimed is:

1. A magnetic tape apparatus comprising:
a magnetic tape; and
a magnetic head,
wherein the magnetic head includes a module including an element array that includes a plurality of magnetic head elements between a pair of servo signal reading elements,
the magnetic tape apparatus changes an angle $\theta$ formed by an axis of the element array with respect to a width direction of the magnetic tape, during running of the magnetic tape in the magnetic tape apparatus, and
the magnetic tape includes a non-magnetic support and a magnetic layer containing ferromagnetic powder,
the non-magnetic support is a polyethylene naphthalate support having a Young's modulus in a width direction of 10000 MPa or more,
the magnetic layer includes a plurality of servo bands,
the following Expression 1 is satisfied:

$$TDSage+TDSenv-TC\leq0.10 \text{ } \mu m, \quad \text{(Expression 1)}$$

in Expression 1,
TDSage is a maximum value of an absolute value of a difference between a servo band interval obtained before storage and a servo band interval obtained after the storage, in an environment of a temperature of 60° C. and of a relative humidity of 20% for 36 hours, and a unit is $\mu m$,
TDSenv is a value calculated by multiplying a difference between a maximum value and a minimum value in servo band intervals obtained respectively in the following five environments by ½, and a unit is $\mu m$:
a temperature of 16° C. and a relative humidity of 20%,
a temperature of 16° C. and a relative humidity of 80%,
a temperature of 26° C. and a relative humidity of 80%,
a temperature of 32° C. and a relative humidity of 20%, and
a temperature of 32° C. and a relative humidity of 55%,
the TC is a value calculated by $TC=L\{\cos(\theta_{initial}-\Delta\theta)-\cos(\theta_{initial}+\Delta\theta)\}$, and a unit is $\mu m$,
the L is a distance between the pair of servo signal reading elements, and a unit is $\mu m$,
the angle $\theta$ at start of the running of the magnetic tape is set as $\theta_{initial}$,
a maximum value of the angle $\theta$ during the running of the magnetic tape is set as $\theta_{max}$ and a minimum value of the angle $\theta$ during the running of the magnetic tape is set as $\theta_{min}$, and
the $\Delta\theta$ is a larger value among values calculated by $\Delta\theta_{max}=\theta_{max}-\theta_{initial}$, and $$\Delta\theta_{min}=\theta_{initial}-\theta_{min}.$$

2. The magnetic tape apparatus according to claim 1, wherein the $\theta_{initial}$ is equal to or more than 1.000° and equal to or less than 45.000°.

3. The magnetic tape apparatus according to claim 2, wherein the $\Delta\theta$ is more than 0.000° and equal to or less than 1.000°.

4. The magnetic tape apparatus according to claim 3, wherein, during the running of the magnetic tape in the magnetic tape apparatus, the angle $\theta$ formed by the axis of the element array with respect to the width direction of the magnetic tape is changed in accordance with dimensional information in the width direction of the magnetic tape acquired during the running.

5. The magnetic tape apparatus according to claim 2, wherein, during the running of the magnetic tape in the magnetic tape apparatus, the angle $\theta$ formed by the axis of the element array with respect to the width direction of the magnetic tape is changed in accordance with dimensional information in the width direction of the magnetic tape acquired during the running.

6. The magnetic tape apparatus according to claim 1, wherein the $\Delta\theta$ is more than 0.000° and equal to or less than 1.000°.

7. The magnetic tape apparatus according to claim 6, wherein, during the running of the magnetic tape in the magnetic tape apparatus, the angle $\theta$ formed by the axis of the element array with respect to the width direction of the magnetic tape is changed in accordance with dimensional information in the width direction of the magnetic tape acquired during the running.

8. The magnetic tape apparatus according to claim 1, wherein, during the running of the magnetic tape in the magnetic tape apparatus, the angle $\theta$ formed by the axis of the element array with respect to the width direction of the magnetic tape is changed in accordance with dimensional information in the width direction of the magnetic tape acquired during the running.

9. The magnetic tape apparatus according to claim 1, wherein the Young's modulus of the polyethylene naphthalate support in the width direction is equal to or more than 10000 MPa and equal to or less than 20000 MPa.

10. The magnetic tape apparatus according to claim 1, wherein a tape thickness of the magnetic tape is equal to or less than 5.6 $\mu m$.

11. The magnetic tape apparatus according to claim 1, wherein a tape thickness of the magnetic tape is equal to or less than 5.2 $\mu m$.

12. The magnetic tape apparatus according to claim 1, wherein the magnetic tape further includes a non-magnetic layer containing non-magnetic powder between the non-magnetic support and the magnetic layer.

13. The magnetic tape apparatus according to claim 1, wherein the magnetic tape further includes a back coating layer containing non-magnetic powder on a surface side of the non-magnetic support opposite to a surface side including the magnetic layer.

14. The magnetic tape apparatus according to claim 1, wherein a vertical squareness ratio of the magnetic tape is equal to or more than 0.60.

* * * * *